United States Patent
Glazebrook

(10) Patent No.: US 11,289,927 B2
(45) Date of Patent: Mar. 29, 2022

(54) MOBILE DEVICE HOLDER FOR PORTABLE ELECTRONIC DEVICES

(71) Applicant: Neal Evan Glazebrook, Howell, MI (US)

(72) Inventor: Neal Evan Glazebrook, Howell, MI (US)

(73) Assignee: Handeholder Products, Inc., Ann Arbor, MI (US)

( * ) Notice: Subject to any disclaimer, the term of this patent is extended or adjusted under 35 U.S.C. 154(b) by 65 days.

(21) Appl. No.: 16/898,711

(22) Filed: Jun. 11, 2020

(65) Prior Publication Data
US 2020/0395769 A1 Dec. 17, 2020

Related U.S. Application Data

(60) Provisional application No. 62/860,488, filed on Jun. 12, 2019.

(51) Int. Cl.
*H01M 10/46* (2006.01)
*H02J 7/00* (2006.01)
*H02J 50/10* (2016.01)

(52) U.S. Cl.
CPC ............ *H02J 7/0044* (2013.01); *H02J 50/10* (2016.02)

(58) Field of Classification Search
CPC ...... H02J 7/0044; H02J 7/0045; H02J 7/0042; H02J 50/005; H02J 50/10
USPC ................................ 320/107, 108, 114, 115
See application file for complete search history.

(56) References Cited

U.S. PATENT DOCUMENTS

| | | | |
|---|---|---|---|
| 2014/0028243 A1* | 1/2014 | Rayner | H04B 1/3888 320/103 |
| 2016/0259374 A1* | 9/2016 | Breiwa | B60R 11/02 |
| 2018/0059758 A1* | 3/2018 | Boatner | G06K 7/1417 |
| 2019/0222042 A1* | 7/2019 | Nook | H01M 50/543 |

* cited by examiner

*Primary Examiner* — Edward Tso
(74) *Attorney, Agent, or Firm* — Remenick PLLC; J Baron Lesperance

(57) ABSTRACT

Disclosed is a mobile device holder for use with electronic and non-electronic devices as it relates to joining one or more devices together such that the devices may be operably interactive.

18 Claims, 17 Drawing Sheets

MOBILE DEVICE HOLDER FOR PORTABLE ELECTRONIC DEVICES

CROSS-REFERENCE TO RELATED APPLICATIONS

This application claims the benefit of U.S. Provisional Application No. 62/860,488, filed Jun. 12, 2019 which is hereby incorporated by reference as though fully set forth therein.

BACKGROUND

1. Field

The present disclosure is directed to holders for electronic and non-electronic devices. More particularly, the present disclosure is directed toward a mobile device holder for joining electronic and non-electronic devices.

2. Background

Electronic (and non-electronic) devices such as smart phones, tablets, or point-of-sale (POS) devices are increasingly portable and used in a variety of situations including business, education, health care, and home use.

These electronic devices may include one or mounting points to connect to other devices, including electronic devices or device mounts. Some electronic devices include a limited set or configuration that limits the orientation or type of devices that can be attached. Therefore, a mobile device holder that includes a plurality of mounting configurations to mount one electronic device to another electronic device in multiple orientations and allows for ease of mount and dismount of devices for upgrades, repair, or maintenance is desirable.

SUMMARY

The present disclosure overcomes the problems and disadvantages associated with current strategies and designs and provides new tools and methods of connecting one mobile device to at least one other mobile device.

An embodiment of the disclosure is directed to a mobile device holder (adapter) that is configured to connect one mobile device to at least one other mobile device.

An embodiment of the disclosure is directed to a mobile device holder that is configured to disconnect one mobile device from at least one other mobile device.

An embodiment of the disclosure is directed to a mobile device holder that is configured to allow for a plurality of connection configurations.

An embodiment of the disclosure is directed to a mobile device holder that is configured to receive upgraded or replacement mobile devices.

An embodiment of the disclosure is directed to a mobile device holder that is configured to secure one or more mobile devices with a plurality of mechanical fasteners.

An embodiment of the disclosure is directed to a mobile device holder that is configured with a plurality of gripping elements.

An embodiment of the disclosure is directed to a mobile device holder that includes a plurality of through holes.

An embodiment of the disclosure is directed to a mobile device holder that includes a plurality of through holes configured to receive one or more threaded inserts.

An embodiment of the disclosure is directed to a mobile device holder that includes a front surface and a back surface, wherein the front surface and the back surface are joined by a top surface, a bottom surface, a right surface and a left surface, wherein the top surface, the bottom surface, the right surface and the left surface each include a planar section defining an outer right edge and an outer left edge, respectively, of the front surface and the back surface, wherein the planar sections of the right surface and the left surface further include a plurality of concave sections, wherein the concave sections extend into the front surface and back surface relative to the planar sections of the right surface and the left surface, and wherein the front surface and back surface further include a plurality of apertures that extend through the top surface, the bottom surface, the right surface and the left surface and receive a plurality of threaded inserts to selectively join the mobile device holder to the mobile device.

An embodiment of the disclosure is directed to a mobile device holder that includes a wireless charging controller connected to a wireless charging coil disposed in between the front surface and the back surface and bounded by the top surface, the bottom surface, the right surface and the left surface, wherein the wireless charging controller regulates electrical energy received from a wireless power source, and wherein the wireless charging coil receives electrical energy from the wireless power source to charge a mobile device.

An embodiment of the disclosure is directed to a mobile device holder that includes a plurality of recessed portions disposed on the front surface and extending into at least a portion of the top surface, the bottom surface, the right surface and the left surface.

An embodiment of the disclosure is directed to a mobile device holder that includes a plurality of recessed portions disposed on the back surface and extending into at least a portion of the top surface, the bottom surface, the right surface and the left surface.

An embodiment of the disclosure is directed to a mobile device holder that includes a plurality of recessed portions disposed on the front surface and the back surface and extending into at least a portion of the top surface, the bottom surface, the right surface and the left surface.

An embodiment of the disclosure is directed to a mobile device holder that includes a front surface further comprising a plurality of ribs connected to the interior of the top surface, the bottom surface, the right surface, and the left surface, wherein the plurality ribs include a plurality of bosses disposed about the plurality of apertures extending through the front surface and the back surface.

An embodiment of the disclosure is directed to a mobile device holder that includes a front surface, a back surface, a top surface, a bottom surface, a right surface, a left surface, and a plurality of apertures disposed on the front surface and the back surface, the apertures extending through the top surface, the bottom surface, the right surface, and the left surface, wherein the front surface comprises an edge of a wall extending about a perimeter formed by the top surface, the bottom surface, the right surface and the left surface and a plurality of bosses surrounding the plurality of apertures, wherein the wall extends from the front surface to the bottom surface and along an interior of the perimeter, wherein the bottom surface includes a plurality of ribs joining the wall and the plurality of bosses containing the plurality of apertures to selectively join the mobile device holder to a mobile device, wherein the top surface, the bottom surface, the right surface and the left surface each include a planar section defining an outer right edge and an outer left edge, respectively, of the front surface and the back surface, and wherein the planar sections of the right surface and the left surface further include a plurality of concave sections, wherein the concave sections extend into the front surface and back surface relative to the planar sections of the right surface and the left surface.

An embodiment of the disclosure is directed to a mobile device holder that includes a wireless charging controller connected to a wireless charging coil disposed in between the front surface and the back surface and bounded by the top surface, the bottom surface, the right surface and the left surface, wherein the wireless charging controller regulates electrical energy received from a wireless power source, and wherein the wireless charging coil receives electrical energy from the wireless power source to charge a mobile device.

An embodiment of the disclosure is directed to a mobile device holder that includes a plurality of recessed portions disposed on the front surface and the back surface and extending into at least a portion of the top surface, the bottom surface, the right surface and the left surface.

An embodiment of the disclosure is directed to a mobile device holder that includes a body having a front surface, a back surface, and a perimeter surface, wherein the perimeter surface is disposed between the front surface and the back surface, the perimeter surface including a first concave section, the first concave section extending into the front surface and the back surface, and a plurality of threaded inserts disposed in a plurality of apertures in the body extending through the front surface to the back surface.

An embodiment of the disclosure is directed to a mobile device holder that includes at least a second concave section of the perimeter surface interposed by a first non-concave section and the first concave section.

An embodiment of the disclosure is directed to a mobile device holder that includes a wireless charging system disposed within the body.

An embodiment of the disclosure is directed to a mobile device holder that includes a wireless charging controller and a wireless charging coil electrically connected to the wireless charging controller.

An embodiment of the disclosure is directed to a mobile device holder that includes a plurality of recessed sections disposed in the front surface of the body between the plurality of apertures.

An embodiment of the disclosure is directed to a mobile device holder that includes a plurality of recessed sections disposed in the back surface of the body between the plurality of apertures.

An embodiment of the disclosure is directed to a mobile device holder that includes a plurality of recessed sections disposed in the front surface and the back surface of the body between the plurality of apertures.

An embodiment of the disclosure is directed to a mobile device holder that includes a front surface of the body that is recessed and includes a plurality of ribs extending from an interior surface of the perimeter surface to a plurality of bosses forming the plurality of apertures.

An embodiment of the disclosure is directed to a mobile device holder that includes a wireless charging system disposed within the recessed surface of the front surface.

Other embodiments and advantages of the disclosure are set forth in part in the description, which follows, and in part, may be obvious from this description, or may be learned from the practice of the disclosure.

DESCRIPTION OF THE DRAWINGS

The disclosure is described in greater detail by way of example only and with reference to the attached drawings, in which.

Figure 1:
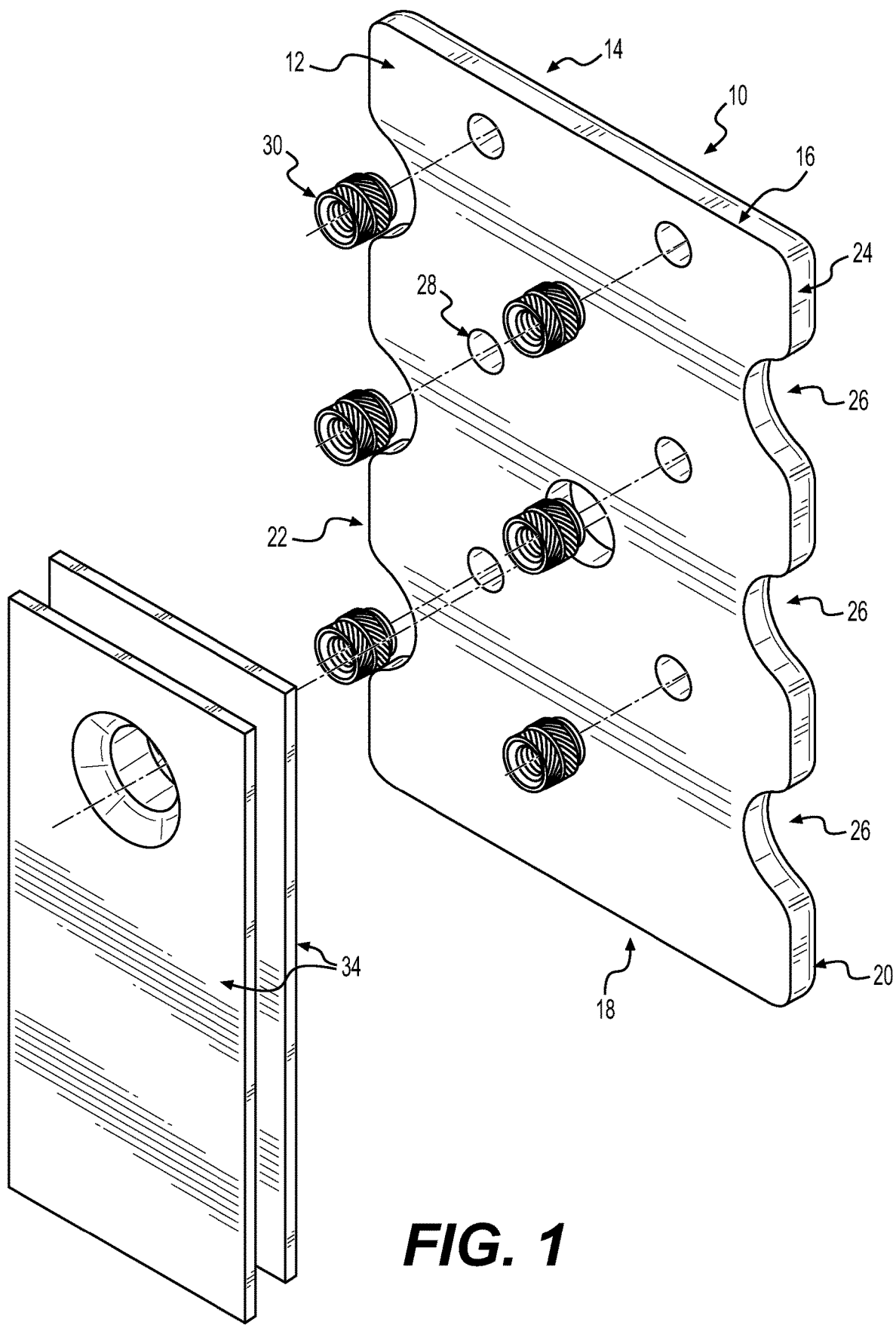
FIG. 1 is an exploded front perspective view of an embodiment of the present disclosure.
Figure 2:
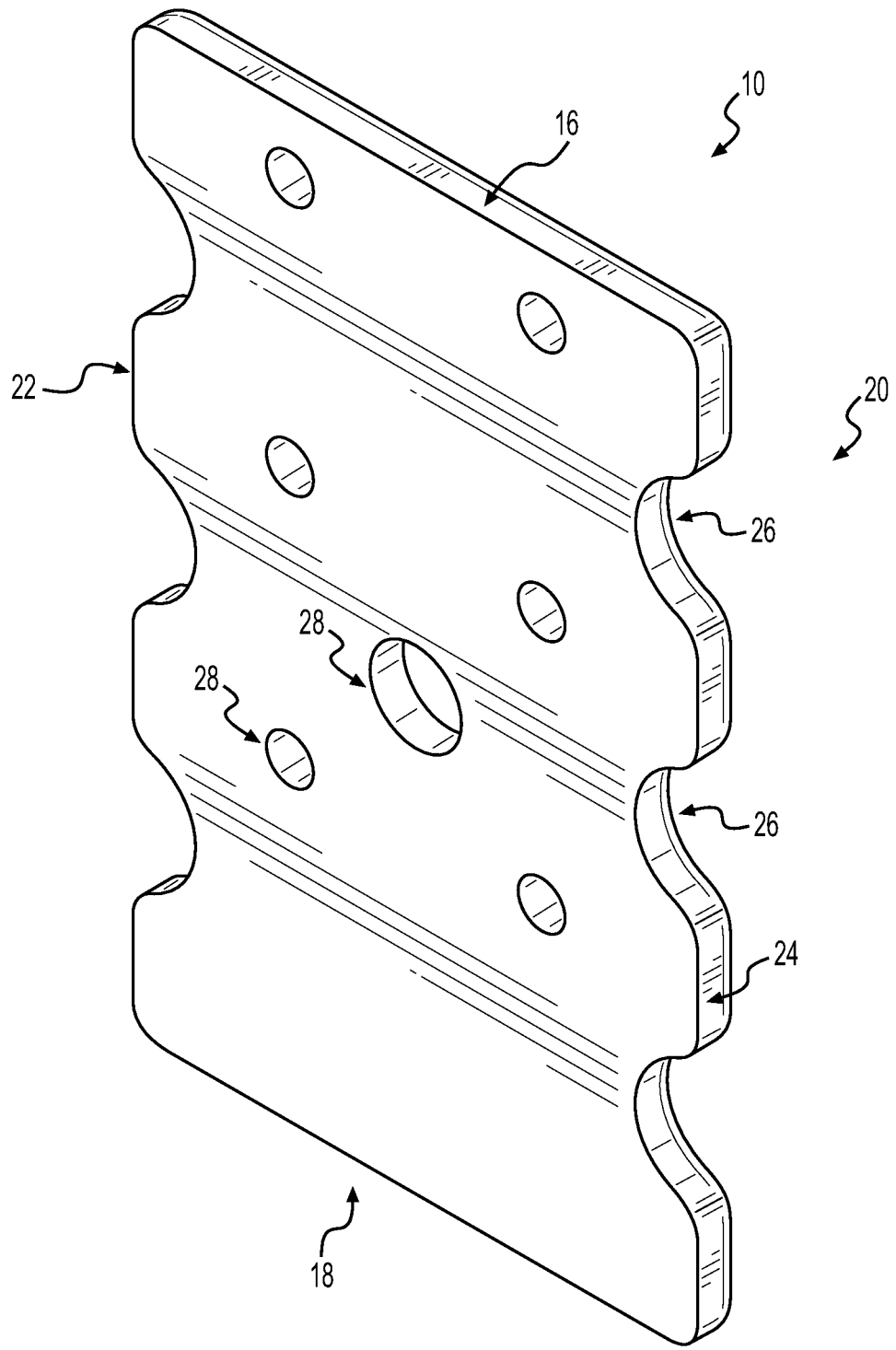
FIG. 2 is an exploded rear perspective view of the embodiment of the present disclosure shown in FIG. 1.

The drawings described herein are for illustrative purposes only of selected embodiments and not all possible or anticipated implementations thereof, and are not intended to limit the scope of the present disclosure.

DESCRIPTION

As embodied and broadly described herein, the disclosures herein provide detailed embodiments of the disclosure. However, the disclosed embodiments are merely exemplary of the disclosure that may be embodied in various and alternative forms. Therefore, there is no intent that specific structural and functional details should be limiting, but rather the intention is that they provide a basis for the claims and as a representative basis for teaching one skilled in the art to variously employ the present disclosure.

Mobile electronic devices are often used in connection with other devices, including other mobile electronic devices. For the purposes of this disclosure, mobile electronic devices include, but are not limited to, smart phones, tablet computers, and point-of-sale (POS) devices. It is contemplated that other electronic and non-electronic devices may be used with the mobile device holder of the present disclosure, including medical devices, measuring devices, imaging devices (e.g., cameras), easels, stands or vehicle mounts. A mobile device holder or adapter that is configured to permit the connection (or pairing) of two or more devices (electronic or non-electronic) is desirable.

Often these electronic devices are mounted to additional devices that improve their usefulness and enable their users to perform additional tasks while securing the electronic devices. For example, a smart phone may be encased with a protective cover. Apart from protecting the smart phone from impact and other damage, the protective cover may include one or more mounting points. These mounting points may be configured in a manner that permits limited connection to other devices; however, the mobile device holder of the present disclosure is configured to engage the mounting points and permit other devices to be connected together in a plurality of configurations.

The mobile device holder of the present disclosure may be configured to engage with a protective device cover or a portion of a mobile device allowing the combined mobile device holder and mobile device to connect to another mobile device. The mobile device holder is configured to receive a plurality of mobile devices allowing for connection with another mobile device that may not have been possible given the limited configuration included in the mobile device (or the protective cover of the mobile device). The mobile device holder therefore enables a plurality of mobile devices to be connected to other mobile devices without the need to modify either of the mobile devices (or their protective cases).

Additionally, the mobile device holder of the present disclosure allows for future devices to be connected together due to the configuration of through holes with threaded fasteners disposed on the mobile device holder. Typically, mobile devices have a predetermined lifetime or may be leased devices, for example. As a result, at some point one mobile device may need to be removed from the mobile device holder. The removal can be easily accomplished using the plurality of threaded inserts and accompanying screws (not shown). The removal of the mobile device from the mobile device holder preserves the integrity of the mobile device (it is not damaged), allowing it to be returned to the lender, resold, or reused in another capacity. Other mobile device holders have used adhesives which can make separating the mobile device from the mobile device holder difficult and may result in damage to the mobile device or the mobile device holder.

The configuration of the mobile device holder of the present disclosure allows for multiple positioning (i.e., joining, connecting) of many mobile devices that can be paired with (i.e., in electronic communication) such as, but not limited to, computing devices, medical devices, scientific devices, measuring devices, imaging devices and communication devices, or devices that include at least some of those attributes. In addition, the mobile device holder is configured to position future devices yet to be developed that include at least a portion of the positioning standards of current mobile devices.

The mobile device holder of the present disclosure improves upon existing holders that are limited by only a 4-point mounting configuration. This limitation prevents additional mounting configurations and therefore limits the user's ability to use some mobile devices with other mobile devices. By including an additional 2 mounting locations, the presently-disclosed mobile device holder provides for additional flexibility in mounting one mobile device relative to one or more mobile devices, such as but not limited to, in parallel or opposing one another. The mobile device holder of the present disclosure also provides for mounting one mobile device to at least one other mobile device in close proximity to the narrow width of the mobile device holder.

According to at least one embodiment of the present disclosure, the mobile device holder may be used to connect a tablet computer to a credit card payment terminal. For example, a tablet computer such as an Apple iPad® may be connected, using the mobile device holder, to a credit card terminal such as, but not limited to, a Miura M010®), a VeriFone e355®, or an Ingenico iSMP4®. The tablet computer and the credit card payment terminal, combined by the mobile device holder, allows a user to take and receive credit card payments through the credit card terminal while also using the tablet computer to send and receive electronic data, look up inventory or customer information, and use other installed programs on the tablet computer including accessing the Internet.

According to at least one embodiment of the present disclosure, the mobile device holder may be used to connect a tablet computer to a scanner device. The scanner device could be for example, a bar code scanner, a QR-code scanner, or an image scanner. The tablet computer and the scanner, combined by the mobile device holder, allows a user to scan items, bar or QR-codes, or other images and upload them to the tablet computer for further processing. The further processing may include communication via the Internet, inventory or product control, quality control, or another operation or procedure that may require the use of a scanner together with a tablet computer.

According to at least one embodiment of the present disclosure, the mobile device holder may be used to connect a tablet computer to a cell phone, including but not limited to a smart phone. For example, a tablet computer may be connected, using the mobile device holder, to a cell phone or smart phone to enable the two devices to be used together. The tablet computer may use the Internet or wireless communication of the cell phone. The tablet computer may be configured to operate the cell phone, such as to make telephone calls, texts, email or other applications installed on the tablet and/or the cell phone. The cell phone may also be configured to access the tablet computer, such as information stored on the tablet computer.

According to at least one embodiment of the present disclosure, the mobile device holder may be used to connect a tablet computer to a thermometer. For example, in a medical situation, a medical staffer, such as a nurse or doctor, may connect a tablet computer to a thermometer for the purpose of measuring the temperature of a patient. The thermometer may be in wireless communication with (or physically connected to) the tablet computer to immediately upload the measured temperature to the electronic file of the patient. In another example, the thermometer may be used in a commercial situation, such as in a food service situation. A user may use the thermometer to measure the temperatures of food items in a kitchen which may then be communicated to the tablet computer for record keeping. In yet another example, the thermometer may be used in an industrial situation, such as a manufacturing plant. The thermometer may be used to measure the temperatures of work in process or other temperature sensitive areas or equipment and record that information to the attached tablet computer.

According to at least one embodiment of the present disclosure, the mobile device holder may be used to connect a tablet computer to a measurement device. The measurement device may be laser distance measuring device, for example. The measurement device may be electronically connected to the tablet computer as well as physically connected via the mobile device holder. Measurements made using the measurement device may be communicated to the attached tablet computer and further utilized by one or more applications of the tablet computer. For example, an architect may use the measuring device to measure the size of rooms of a structure in order to generate a CAD data file of the structure.

According to at least one embodiment of the present disclosure, the mobile device holder may be used to connect a tablet computer to a battery. The battery may be configured to connect to the tablet computer (such as by a cable or wirelessly (i.e., inductively)) to provide electrical power to the tablet computer. The combined tablet computer and battery may then provide the user of the tablet computer with extended operational time due to the externally mounted (via the mobile device holder) battery supplementing the internal battery of the tablet computer.

According to at least one embodiment of the present disclosure, the mobile device holder may be used to connect a tablet computer to a light source. The light source may be configured as a light emitting diode (LED) and may be electrically operable by the tablet computer. The light source may be mounted relative to the tablet computer via the mobile device holder that the light source may be used as a flashlight when the combined tablet computer/light source is held by a user. The light source may also be configured to operate in cooperation with an onboard camera of the tablet computer and positioned by the mobile device holder out of the view of the onboard camera.

According to at least one embodiment of the present disclosure, the mobile device holder may be used to connect a tablet computer to a card bay. The card bay may be used to store a plurality of cards, such as but not limited to loyalty cards, gift cards, store credit cards, coupons, hotel room key cards, security pass/door access key cards, identification cards, passports and passport cards, airline and other travel cards (i.e., boarding passes, train tickets, etc.). It is understood that the card bay may be configured to hold other items apart from card-based items.

According to at least one embodiment of the present disclosure, the mobile device holder may be used to connect a tablet computer to a pen holder. The pen holder may include an electronic pen (i.e., stylus) that may be configured to operate with the tablet computer and/or other devices and surfaces. The pen holder may secure the pen and keep the pen in close proximity to the tablet computer via the mobile device holder.

According to at least one embodiment of the present disclosure, the mobile device holder may be used to connect a tablet computer to a shoulder strap. The shoulder strap may be configured to engage the shoulder of a user and allow the user to carry the tablet computer "hands free". The mobile device holder allows the shoulder strap to be connected to the tablet computer in a plurality of configurations or positions.

According to at least one embodiment of the present disclosure, the mobile device holder may be used to connect a tablet computer to a hand strap. The hand strap may be configured to engage the hand of a user and allow the user to carry the tablet computer while leaving the user's hands open ("free") and available for other tasks or operations. The mobile device holder allows the hand strap to be connected to the tablet computer in a plurality of configurations or positions.

According to at least one embodiment of the present disclosure, the mobile device holder may be used to connect a tablet computer to at least a portion of a docking station. The docking station may be configured to receive the tablet computer and provide physical support for the tablet computer. Additionally and alternatively, the docking station may include electrical connections to the tablet computer to provide electrical power (i.e., operate the tablet computer and/or charge the battery of the tablet computer) as well as secure wired communication between the tablet computer and the docking station (as well as network connected to the docking station).

According to at least one embodiment of the present disclosure, the mobile device holder may be used to connect a tablet computer to a support stand. The support stand may be configured to support the tablet computer, such as but not limited to on a horizontal surface. The support stand may be adjustable to change the orientation of the tablet computer.

According to at least one embodiment of the present disclosure, the mobile device holder may be used to connect a tablet computer to a pole. The pole may be configured to support the tablet computer, such as at a retail checkout, service desk, customer service or purchase station. The pole may include connections to the tablet computer, such as for electrical power and/or network connections.

According to at least one embodiment of the present disclosure, the mobile device holder may be used to connect a phone case including a phone (such as a smart phone) to a credit card payment terminal. For example, a phone case may be connected, using the mobile device holder, to a credit card terminal such as, but not limited to, a Miura M010®), a VeriFone e355®, or an Ingenico iSMP4®. The phone case and the credit card payment terminal, combined by the mobile device holder, allow a user to take and receive credit card payments through the credit card terminal.

According to at least one embodiment of the present disclosure, the mobile device holder may be used to connect a phone case to a scanner device. The scanner device could be for example, a bar code scanner, a QR-code scanner, or an image scanner. The phone case and the scanner, combined by the mobile device holder, allows a user to scan items, bar or QR-codes, or other images and upload them for further processing. The further processing may include communication via the Internet, inventory or product control, quality control, or another operation or procedure that may require the use of a scanner and the phone case.

According to at least one embodiment of the present disclosure, the mobile device holder may be used to connect a phone case to a cell phone, including but not limited to a smart phone. For example, a phone case may be connected, using the mobile device holder, to a cell phone or smart phone to enable the two devices to be used together.

According to at least one embodiment of the present disclosure, the mobile device holder may be used to connect a phone case to a thermometer. For example, in a medical situation, a medical staffer, such as a nurse or doctor, may connect a phone case to a thermometer for the purpose of measuring the temperature of a patient. The thermometer may be in wireless communication with (or physically connected to) the phone case to immediately upload the measured temperature to the electronic file of the patient. In another example, the thermometer may be used in a commercial situation, such as in a food service situation. A user may use the thermometer to measure the temperatures of food items in a kitchen which may then be communicated to the tablet computer for record keeping. In yet another example, the thermometer may be used in an industrial situation, such as a manufacturing plant. The thermometer may be used to measure the temperatures of work in process or other temperature sensitive areas or equipment and record that information to the attached phone case.

According to at least one embodiment of the present disclosure, the mobile device holder may be used to connect a phone case to a measurement device. The measurement device may be laser distance measuring device, for example. The measurement device may be electronically connected to the phone case as well as physically connected via the mobile device holder. Measurements made using the measurement device may be communicated to the attached phone case and further utilized by one or more applications of the phone case. For example, an architect may use the measuring device to measure the size of rooms of a structure in order to generate a CAD data file of the structure.

According to at least one embodiment of the present disclosure, the mobile device holder may be used to connect a phone case to a battery. The battery may be configured to connect to the phone case (such as by a cable or wirelessly (i.e., inductively)) to provide electrical power to the phone case. The combined phone case and battery may then provide the user of the phone case with extended operational time due to the externally mounted (via the mobile device holder) battery supplementing the internal battery of the phone case.

According to at least one embodiment of the present disclosure, the mobile device holder may be used to connect a phone case to a light source. The light source may be configured as a light emitting diode (LED) and may be electrically operable by the phone case. The light source may be mounted relative to the phone case via the mobile device holder that the light source may be used as a flashlight when the combined phone case/light source is held by a user. The light source may also be configured to operate in cooperation with an onboard camera of the phone case and positioned by the mobile device holder out of the view of the onboard camera.

According to at least one embodiment of the present disclosure, the mobile device holder may be used to connect a phone case to a card bay. The card bay may be used to store a plurality of cards, such as but not limited to loyalty cards, gift cards, store credit cards, coupons, hotel room key cards, security pass/door access key cards, identification cards, passports and passport cards, airline and other travel cards (i.e., boarding passes, train tickets, etc.). It is understood that the card bay may be configured to hold other items apart from card-based items.

According to at least one embodiment of the present disclosure, the mobile device holder may be used to connect a phone case to a pen holder. The pen holder may include an electronic pen (i.e., stylus) that may be configured to operate with the phone case and/or other devices and surfaces. The pen holder may secure the pen and keep the pen in close proximity to the phone case via the mobile device holder.

According to at least one embodiment of the present disclosure, the mobile device holder may be used to connect a phone case to a shoulder strap. The shoulder strap may be configured to engage the shoulder of a user and allow the user to carry the phone case "hands free". The mobile device holder allows the shoulder strap to be connected to the phone case in a plurality of configurations or positions.

According to at least one embodiment of the present disclosure, the mobile device holder may be used to connect a phone case to a hand strap. The hand strap may be configured to engage the hand of a user and allow the user to carry the phone case while leaving the user's hands open and available for other tasks or operations. The mobile device holder allows the hand strap to be connected to the phone case in a plurality of configurations or positions.

According to at least one embodiment of the present disclosure, the mobile device holder may be used to connect a phone case to at least a portion of a docking station. The docking station may be configured to receive the phone case and provide physical support for the phone case. Additionally and alternatively, the docking station may include electrical connections to the phone case to provide electrical power (i.e., operate the phone case and/or charge the battery of the tablet computer) as well as secure wired communication between the phone case and the docking station (as well as network connected to the docking station).

According to at least one embodiment of the present disclosure, the mobile device holder may be used to connect a phone case to a support stand. The support stand may be configured to support the phone case, such as but not limited to on a horizontal surface. The support stand may be adjustable to change the orientation of the phone case.

According to at least one embodiment of the present disclosure, the mobile device holder may be used to connect a phone case to a pole. The pole may be configured to support the phone case, such as at a retail checkout, service desk, customer service or purchase station. The pole may include connections to the phone case, such as for electrical power and/or network connections.

According to at least one embodiment of the present disclosure, the mobile device holder may be used to connect a cell phone or "smart" phone to a credit card payment terminal. As used herein, "smart" refers to an electronic device that at least includes one or more of the following: a processor, memory and wired/wireless connections to the Internet. For example, a smart phone may be connected, using the mobile device holder, to a credit card terminal such as, but not limited to, a Miura M010®, a VeriFone e355®, or an Ingenico iSMP4®. The smart phone and the credit card payment terminal, combined by the mobile device holder, allow a user to take and receive credit card payments through the credit card terminal.

According to at least one embodiment of the present disclosure, the mobile device holder may be used to connect a smart phone to a scanner device. The scanner device could be for example, a bar code scanner, a QR-code scanner, or an image scanner. The smart phone and the scanner, combined by the mobile device holder, allows a user to scan items, bar or QR-codes, or other images and upload them for further processing. The further processing may include communication via the Internet, inventory or product control, quality control, or another operation or procedure that may require the use of a scanner and the smart phone.

According to at least one embodiment of the present disclosure, the mobile device holder may be used to connect a smart phone to a thermometer. For example, in a medical situation, a medical staffer, such as a nurse or doctor, may connect a smart phone to a thermometer for the purpose of measuring the temperature of a patient. The thermometer may be in wireless communication with (or physically connected to) the smart phone to immediately upload the measured temperature to the electronic file of the patient. In another example, the thermometer may be used in a commercial situation, such as in a food service situation. A user may use the thermometer to measure the temperatures of food items in a kitchen which may then be communicated to the tablet computer for record keeping. In yet another example, the thermometer may be used in an industrial situation, such as a manufacturing plant. The thermometer may be used to measure the temperatures of work in process or other temperature sensitive areas or equipment and record that information to the attached smart phone.

According to at least one embodiment of the present disclosure, the mobile device holder may be used to connect a smart phone to a measurement device. The measurement device may be laser distance measuring device, for example. The measurement device may be electronically connected to the smart phone as well as physically connected via the mobile device holder. Measurements made using the measurement device may be communicated to the attached smart phone and further utilized by one or more applications of the smart phone. For example, an architect may use the measuring device to measure the size of rooms of a structure in order to generate a CAD data file of the structure.

According to at least one embodiment of the present disclosure, the mobile device holder may be used to connect a smart phone to a battery. The battery may be configured to connect to the smart phone (such as by a cable or wirelessly (i.e., inductively)) to provide electrical power to the smart phone. The combined smart phone and battery may then provide the user of the smart phone with extended operational time due to the externally mounted (via the mobile device holder) battery supplementing the internal battery of the smart phone.

According to at least one embodiment of the present disclosure, the mobile device holder may be used to connect a smart phone to a light source. The light source may be configured as a light emitting diode (LED) and may be electrically operable by the smart phone. The light source may be mounted relative to the smart phone via the mobile device holder that the light source may be used as a flashlight when the combined smart phone/light source is held by a user. The light source may also be configured to operate in cooperation with an onboard camera of the smart phone and positioned by the mobile device holder out of the view of the onboard camera.

According to at least one embodiment of the present disclosure, the mobile device holder may be used to connect a smart phone to a card bay. The card bay may be used to store a plurality of cards, such as but not limited to loyalty cards, gift cards, store credit cards, coupons, hotel room key cards, security pass/door access key cards, identification cards, passports and passport cards, airline and other travel cards (i.e., boarding passes, train tickets, etc.). It is understood that the card bay may be configured to hold other items apart from card-based items.

According to at least one embodiment of the present disclosure, the mobile device holder may be used to connect a smart phone to a pen holder. The pen holder may include an electronic pen (i.e., stylus) that may be configured to operate with the smart phone and/or other devices and surfaces. The pen holder may secure the pen and keep the pen in close proximity to the smart phone via the mobile device holder.

According to at least one embodiment of the present disclosure, the mobile device holder may be used to connect a smart phone to a shoulder strap. The shoulder strap may be configured to engage the shoulder of a user and allow the user to carry the smart phone "hands free". The mobile device holder allows the shoulder strap to be connected to the smart phone in a plurality of configurations or positions.

According to at least one embodiment of the present disclosure, the mobile device holder may be used to connect a smart phone to a hand strap. The hand strap may be configured to engage the hand of a user and allow the user to carry the smart phone while leaving the user's hands open and available for other tasks or operations. The mobile device holder allows the hand strap to be connected to the smart phone in a plurality of configurations or positions.

According to at least one embodiment of the present disclosure, the mobile device holder may be used to connect a smart phone to at least a portion of a docking station. The docking station may be configured to receive the smart phone and provide physical support for the smart phone. Additionally and alternatively, the docking station may include electrical connections to the smart phone to provide electrical power (i.e., operate the smart phone and/or charge the battery of the tablet computer) as well as secure wired communication between the smart phone and the docking station (as well as network connected to the docking station).

According to at least one embodiment of the present disclosure, the mobile device holder may be used to connect a smart phone to a support stand. The support stand may be configured to support the smart phone, such as but not limited to on a horizontal surface. The support stand may be adjustable to change the orientation of the smart phone.

According to at least one embodiment of the present disclosure, the mobile device holder may be used to connect a smart phone to a pole. The pole may be configured to support the smart phone, such as at a retail checkout, service desk, customer service or purchase station. The pole may include connections to the smart phone, such as for electrical power and/or network connections.

According to at least one embodiment of the present disclosure, the mobile device holder may be used to connect a computer (e.g., a laptop or desktop computer) to a credit card payment terminal. For example, a computer may be connected, using the mobile device holder, to a credit card terminal such as, but not limited to, a Miura M010®), a VeriFone e355®, or an Ingenico iSMP4®. The computer and the credit card payment terminal, combined by the mobile device holder, allow a user to take and receive credit card payments through the credit card terminal.

According to at least one embodiment of the present disclosure, the mobile device holder may be used to connect a computer to a scanner device. The scanner device could be for example, a bar code scanner, a QR-code scanner, or an image scanner. The computer and the scanner, combined by the mobile device holder, allows a user to scan items, bar or QR-codes, or other images and upload them for further processing. The further processing may include communication via the Internet, inventory or product control, quality control, or another operation or procedure that may require the use of a scanner and the computer.

According to at least one embodiment of the present disclosure, the mobile device holder may be used to connect a computer to a thermometer. For example, in a medical situation, a medical staffer, such as a nurse or doctor, may connect a computer to a thermometer for the purpose of measuring the temperature of a patient. The thermometer may be in wireless communication with (or physically connected to) the computer to immediately upload the measured temperature to the electronic file of the patient. In another example, the thermometer may be used in a commercial situation, such as in a food service situation. A user may use the thermometer to measure the temperatures of food items in a kitchen which may then be communicated to the computer for record keeping. In yet another example, the thermometer may be used in an industrial situation, such as a manufacturing plant. The thermometer may be used to measure the temperatures of work in process or other temperature sensitive areas or equipment and record that information to the attached computer.

According to at least one embodiment of the present disclosure, the mobile device holder may be used to connect a computer to a measurement device. The measurement device may be laser distance measuring device, for example. The measurement device may be electronically connected to the computer as well as physically connected via the mobile device holder. Measurements made using the measurement device may be communicated to the attached computer and further utilized by one or more applications of the computer. For example, an architect may use the measuring device to measure the size of rooms of a structure in order to generate a CAD data file of the structure.

According to at least one embodiment of the present disclosure, the mobile device holder may be used to connect a computer to a battery. The battery may be configured to connect to the computer (such as by a cable or wirelessly (i.e., inductively)) to provide electrical power to the computer. The combined computer and battery may then provide the user of the computer with extended operational time due to the externally mounted (via the mobile device holder) battery supplementing the internal battery of the computer.

According to at least one embodiment of the present disclosure, the mobile device holder may be used to connect a computer to a light source. The light source may be configured as a light emitting diode (LED) and may be electrically operable by the computer. The light source may be mounted relative to the computer via the mobile device holder that the light source may be used as a flashlight when the combined computer/light source is held by a user. The light source may also be configured to operate in cooperation with an onboard camera of the computer and positioned by the mobile device holder out of the view of the onboard camera.

According to at least one embodiment of the present disclosure, the mobile device holder may be used to connect a computer to a card bay. The card bay may be used to store a plurality of cards, such as but not limited to loyalty cards, gift cards, store credit cards, coupons, hotel room key cards, security pass/door access key cards, identification cards, passports and passport cards, airline and other travel cards (i.e., boarding passes, train tickets, etc.). It is understood that the card bay may be configured to hold other items apart from card-based items.

According to at least one embodiment of the present disclosure, the mobile device holder may be used to connect a computer to a pen holder. The pen holder may include an electronic pen (i.e., stylus) that may be configured to operate with the computer and/or other devices and surfaces. The pen holder may secure the pen and keep the pen in close proximity to the computer via the mobile device holder.

According to at least one embodiment of the present disclosure, the mobile device holder may be used to connect a computer to a shoulder strap. The shoulder strap may be configured to engage the shoulder of a user and allow the user to carry the computer "hands free". The mobile device holder allows the shoulder strap to be connected to the computer in a plurality of configurations or positions.

According to at least one embodiment of the present disclosure, the mobile device holder may be used to connect a computer to a hand strap. The hand strap may be configured to engage the hand of a user and allow the user to carry the computer while leaving the user's hands open and available for other tasks or operations. The mobile device holder allows the hand strap to be connected to the computer in a plurality of configurations or positions.

According to at least one embodiment of the present disclosure, the mobile device holder may be used to connect a computer to at least a portion of a docking station. The docking station may be configured to receive the computer and provide physical support for the computer. Additionally and alternatively, the docking station may include electrical connections to the computer to provide electrical power (i.e., operate the computer and/or charge the battery of the tablet computer) as well as secure wired communication between the computer and the docking station (as well as network connected to the docking station).

According to at least one embodiment of the present disclosure, the mobile device holder may be used to connect a computer to a support stand. The support stand may be configured to support the computer, such as but not limited to on a horizontal surface. The support stand may be adjustable to change the orientation of the computer.

According to at least one embodiment of the present disclosure, the mobile device holder may be used to connect a computer to a pole. The pole may be configured to support the computer, such as at a retail checkout, service desk, customer service or purchase station. The pole may include connections to the computer, such as for electrical power and/or network connections.

According to at least one embodiment of the present disclosure, the mobile device holder may be used to connect a kiosk (i.e., a retail or vending booth, sales location) to a credit card payment terminal. For example, a kiosk may be connected, using the mobile device holder, to a credit card terminal such as, but not limited to, a Miura M010®), a VeriFone e355®, or an Ingenico iSMP4®. The kiosk and the credit card payment terminal, combined by the mobile device holder, allow a user to take and receive credit card payments through the credit card terminal.

According to at least one embodiment of the present disclosure, the mobile device holder may be used to connect a kiosk to a scanner device. The scanner device could be for example, a bar code scanner, a QR-code scanner, or an image scanner. The kiosk and the scanner, combined by the mobile device holder, allows a user to scan items, bar or QR-codes, or other images and upload them for further processing. The further processing may include communication via the Internet, inventory or product control, quality control, or another operation or procedure that may require the use of a scanner and the kiosk.

According to at least one embodiment of the present disclosure, the mobile device holder may be used to connect a kiosk to a thermometer. For example, in a medical situation, a medical staffer, such as a nurse or doctor, may connect a kiosk to a thermometer for the purpose of measuring the temperature of a patient. The thermometer may be in wireless communication with (or physically connected to) the kiosk to immediately upload the measured temperature to the electronic file of the patient. In another example, the thermometer may be used in a commercial situation, such as in a food service situation. A user may use the thermometer to measure the temperatures of food items in a kitchen which may then be communicated to the kiosk for record keeping. In yet another example, the thermometer may be used in an industrial situation, such as a manufacturing plant. The thermometer may be used to measure the temperatures of work in process or other temperature sensitive areas or equipment and record that information to the attached kiosk.

According to at least one embodiment of the present disclosure, the mobile device holder may be used to connect a kiosk to a measurement device. The measurement device may be laser distance measuring device, for example. The measurement device may be electronically connected to the kiosk as well as physically connected via the mobile device holder. Measurements made using the measurement device may be communicated to the attached kiosk and further utilized by one or more applications of the kiosk. For example, an architect may use the measuring device to measure the size of rooms of a structure in order to generate a CAD data file of the structure.

According to at least one embodiment of the present disclosure, the mobile device holder may be used to connect a kiosk to a battery. The battery may be configured to connect to the kiosk (such as by a cable or wirelessly (i.e., inductively)) to provide electrical power to the computer. The combined kiosk and battery may then provide the user of the kiosk with extended operational time due to the externally mounted (via the mobile device holder) battery supplementing the internal battery of the kiosk.

According to at least one embodiment of the present disclosure, the mobile device holder may be used to connect a kiosk to a light source. The light source may be configured as a light emitting diode (LED) and may be electrically operable by the kiosk. The light source may be mounted relative to the kiosk via the mobile device holder that the light source may be used as a flashlight when the combined kiosk/light source is held by a user. The light source may also be configured to operate in cooperation with an onboard camera of the kiosk and positioned by the mobile device holder out of the view of the onboard camera.

According to at least one embodiment of the present disclosure, the mobile device holder may be used to connect a kiosk to a card bay. The card bay may be used to store a plurality of cards, such as but not limited to loyalty cards, gift cards, store credit cards, coupons, hotel room key cards, security pass/door access key cards, identification cards, passports and passport cards, airline and other travel cards (i.e., boarding passes, train tickets, etc.). It is understood that the card bay may be configured to hold other items apart from card-based items.

According to at least one embodiment of the present disclosure, the mobile device holder may be used to connect a kiosk to a pen holder. The pen holder may include an electronic pen (i.e., stylus) that may be configured to operate with the kiosk and/or other devices and surfaces. The pen holder may secure the pen and keep the pen in close proximity to the kiosk via the mobile device holder.

According to at least one embodiment of the present disclosure, the mobile device holder may be used to connect a kiosk to a shoulder strap. The shoulder strap may be configured to engage the shoulder of a user and allow the user to carry the kiosk "hands free". The mobile device holder allows the shoulder strap to be connected to the kiosk in a plurality of configurations or positions.

According to at least one embodiment of the present disclosure, the mobile device holder may be used to connect a kiosk to a hand strap. The hand strap may be configured to engage the hand of a user and allow the user to carry the kiosk while leaving the user's hands open and available for other tasks or operations. The mobile device holder allows the hand strap to be connected to the kiosk in a plurality of configurations or positions.

According to at least one embodiment of the present disclosure, the mobile device holder may be used to connect a kiosk to at least a portion of a docking station. The docking station may be configured to receive the kiosk and provide physical support for the kiosk. Additionally, and alternatively the docking station may include electrical connections to the kiosk to provide electrical power (i.e., operate the kiosk and/or charge the battery of the kiosk) as well as secure wired communication between the kiosk and the docking station (as well as network connected to the docking station).

According to at least one embodiment of the present disclosure, the mobile device holder may be used to connect a kiosk to a support stand. The support stand may be configured to support the kiosk, such as but not limited to on a horizontal surface. The support stand may be adjustable to change the orientation of the kiosk.

According to at least one embodiment of the present disclosure, the mobile device holder may be used to connect a kiosk to a pole. The pole may be configured to support the kiosk, such as at a retail checkout, service desk, customer service or purchase station. The pole may include connections to the kiosk, such as for electrical power and/or network connections.

According to at least one embodiment of the present disclosure, the mobile device holder may be used to connect a desk (e.g., a workstation, drafting table, conference table, smart desk) to a credit card payment terminal. For example, a desk may be connected, using the mobile device holder, to a credit card terminal such as, but not limited to, a Miura M010®, a VeriFone e355®, or an Ingenico iSMP4®. The desk and the credit card payment terminal, combined by the mobile device holder, allow a user to take and receive credit card payments through the credit card terminal.

According to at least one embodiment of the present disclosure, the mobile device holder may be used to connect a desk to a scanner device. The scanner device could be for example, a bar code scanner, a QR-code scanner, or an image scanner. The desk and the scanner, combined by the mobile device holder, allows a user to scan items, bar or QR-codes, or other images and upload them for further processing. The further processing may include communication via the Internet, inventory or product control, quality control, or another operation or procedure that may require the use of a scanner and the desk.

According to at least one embodiment of the present disclosure, the mobile device holder may be used to connect a desk to a thermometer. For example, in a medical situation, a medical staffer, such as a nurse or doctor, may connect a desk to a thermometer for the purpose of measuring the temperature of a patient. The thermometer may be in wireless communication with (or physically connected to) the desk to immediately upload the measured temperature to the electronic file of the patient. In another example, the thermometer may be used in a commercial situation, such as in a food service situation. A user may use the thermometer to measure the temperatures of food items in a kitchen which may then be communicated to the desk for record keeping. In yet another example, the thermometer may be used in an industrial situation, such as a manufacturing plant. The thermometer may be used to measure the temperatures of work in process or other temperature sensitive areas or equipment and record that information to the attached desk.

According to at least one embodiment of the present disclosure, the mobile device holder may be used to connect a desk to a measurement device. The measurement device may be laser distance measuring device, for example. The measurement device may be electronically connected to the desk as well as physically connected via the mobile device holder. Measurements made using the measurement device may be communicated to the attached desk and further utilized by one or more applications of the desk. For example, an architect may use the measuring device to measure the size of rooms of a structure in order to generate a CAD data file of the structure.

According to at least one embodiment of the present disclosure, the mobile device holder may be used to connect a desk to a battery. The battery may be configured to connect to the desk (such as by a cable or wirelessly (i.e., inductively)) to provide electrical power to the computer. The combined desk and battery may then provide the user of the desk with extended operational time due to the externally mounted (via the mobile device holder) battery supplementing the internal battery of the desk.

According to at least one embodiment of the present disclosure, the mobile device holder may be used to connect a desk to a light source. The light source may be configured as a light emitting diode (LED) and may be electrically operable by the desk. The light source may be mounted relative to the desk via the mobile device holder that the light source may be used as a flashlight when the combined desk/light source is held by a user. The light source may also be configured to operate in cooperation with an onboard camera of the desk and positioned by the mobile device holder out of the view of the onboard camera.

According to at least one embodiment of the present disclosure, the mobile device holder may be used to connect a desk to a card bay. The card bay may be used to store a plurality of cards, such as but not limited to loyalty cards, gift cards, store credit cards, coupons, hotel room key cards, security pass/door access key cards, identification cards, passports and passport cards, airline and other travel cards (i.e., boarding passes, train tickets, etc.). It is understood that the card bay may be configured to hold other items apart from card-based items.

According to at least one embodiment of the present disclosure, the mobile device holder may be used to connect a desk to a pen holder. The pen holder may include an electronic pen (i.e., stylus) that may be configured to operate with the desk and/or other devices and surfaces. The pen holder may secure the pen and keep the pen in close proximity to the desk via the mobile device holder.

According to at least one embodiment of the present disclosure, the mobile device holder may be used to connect a desk to a shoulder strap. The shoulder strap may be configured to engage the shoulder of a user and allow the user to carry the desk "hands free". The mobile device holder allows the shoulder strap to be connected to the desk in a plurality of configurations or positions.

According to at least one embodiment of the present disclosure, the mobile device holder may be used to connect a desk to a hand strap. The hand strap may be configured to engage the hand of a user and allow the user to carry the desk while leaving the user's hands open and available for other tasks or operations. The mobile device holder allows the hand strap to be connected to the desk in a plurality of configurations or positions.

According to at least one embodiment of the present disclosure, the mobile device holder may be used to connect a desk to at least a portion of a docking station. The docking station may be configured to receive the desk and provide physical support for the desk. Additionally, and alternatively the docking station may include electrical connections to the desk to provide electrical power (i.e., operate the desk and/or charge the battery of the desk) as well as secure wired communication between the desk and the docking station (as well as network connected to the docking station).

According to at least one embodiment of the present disclosure, the mobile device holder may be used to connect a desk to a support stand. The support stand may be configured to support the desk, such as but not limited to on a horizontal surface. The support stand may be adjustable to change the orientation of the desk.

According to at least one embodiment of the present disclosure, the mobile device holder may be used to connect a desk to a pole. The pole may be configured to support the desk, such as at a retail checkout, service desk, customer service or purchase station. The pole may include connections to the desk, such as for electrical power and/or network connections.

According to at least one embodiment of the present disclosure, the mobile device holder may be used to connect a wall (e.g., a vertical surface, a divider, a partition, a smart wall, electronic message/white board) to a credit card payment terminal. For example, a wall may be connected, using the mobile device holder, to a credit card terminal such as, but not limited to, a Miura M010®, a VeriFone e355®, or an Ingenico iSMP4®. The wall and the credit card payment terminal, combined by the mobile device holder, allow a user to take and receive credit card payments through the credit card terminal.

According to at least one embodiment of the present disclosure, the mobile device holder may be used to connect a wall to a scanner device. The scanner device could be for example, a bar code scanner, a QR-code scanner, or an image scanner. The wall and the scanner, combined by the mobile device holder, allows a user to scan items, bar or QR-codes, or other images and upload them for further processing. The further processing may include communication via the Internet, inventory or product control, quality control, or another operation or procedure that may require the use of a scanner and the wall.

According to at least one embodiment of the present disclosure, the mobile device holder may be used to connect a wall to a thermometer. For example, in a medical situation, a medical staffer, such as a nurse or doctor, may connect a wall to a thermometer for the purpose of measuring the temperature of a patient. The thermometer may be in wireless communication with (or physically connected to) the wall to immediately upload the measured temperature to the electronic file of the patient. In another example, the thermometer may be used in a commercial situation, such as in a food service situation. A user may use the thermometer to measure the temperatures of food items in a kitchen which may then be communicated to the wall for record keeping. In yet another example, the thermometer may be used in an industrial situation, such as a manufacturing plant. The thermometer may be used to measure the temperatures of work in process or other temperature sensitive areas or equipment and record that information to the attached wall.

According to at least one embodiment of the present disclosure, the mobile device holder may be used to connect a wall to a measurement device. The measurement device may be laser distance measuring device, for example. The measurement device may be electronically connected to the wall as well as physically connected via the mobile device holder. Measurements made using the measurement device may be communicated to the attached wall and further utilized by one or more applications of the wall. For example, an architect may use the measuring device to measure the size of rooms of a structure in order to generate a CAD data file of the structure.

According to at least one embodiment of the present disclosure, the mobile device holder may be used to connect a wall to a battery. The battery may be configured to connect to the wall (such as by a cable or wirelessly (i.e., inductively)) to provide electrical power to the computer. The combined wall and battery may then provide the user of the wall with extended operational time due to the externally mounted (via the mobile device holder) battery supplementing the internal battery of the wall.

According to at least one embodiment of the present disclosure, the mobile device holder may be used to connect a wall to a light source. The light source may be configured as a light emitting diode (LED) and may be electrically operable by the wall. The light source may be mounted relative to the wall via the mobile device holder that the light source may be used as a flashlight. The light source may also be configured to operate in cooperation with an onboard camera of the wall and positioned by the mobile device holder out of the view of the onboard camera.

According to at least one embodiment of the present disclosure, the mobile device holder may be used to connect a wall to a card bay. The card bay may be used to store a plurality of cards, such as but not limited to loyalty cards, gift cards, store credit cards, coupons, hotel room key cards, security pass/door access key cards, identification cards, passports and passport cards, airline and other travel cards (i.e., boarding passes, train tickets, etc.). It is understood that the card bay may be configured to hold other items apart from card-based items.

According to at least one embodiment of the present disclosure, the mobile device holder may be used to connect a wall to a pen holder. The pen holder may include an electronic pen (i.e., stylus) that may be configured to operate with the wall and/or other devices and surfaces. The pen holder may secure the pen and keep the pen in close proximity to the wall via the mobile device holder.

According to at least one embodiment of the present disclosure, the mobile device holder may be used to connect a wall to a shoulder strap. The shoulder strap may be configured to engage the shoulder of a user and allow the user to carry the wall "hands free". The mobile device holder allows the shoulder strap to be connected to the wall in a plurality of configurations or positions.

According to at least one embodiment of the present disclosure, the mobile device holder may be used to connect a wall to a hand strap. The hand strap may be configured to engage the hand of a user and allow the user to carry the wall while leaving the user's hands open and available for other tasks or operations. The mobile device holder allows the hand strap to be connected to the wall in a plurality of configurations or positions.

According to at least one embodiment of the present disclosure, the mobile device holder may be used to connect a wall to at least a portion of a docking station. The docking station may be configured to receive the wall and provide physical support for the wall. Additionally, and alternatively the docking station may include electrical connections to the wall to provide electrical power (i.e., operate the wall and/or charge the battery of the wall) as well as secure wired communication between the wall and the docking station (as well as network connected to the docking station).

According to at least one embodiment of the present disclosure, the mobile device holder may be used to connect a wall to a support stand. The support stand may be configured to support the wall, such as but not limited to on a horizontal surface. The support stand may be adjustable to change the orientation of the wall.

According to at least one embodiment of the present disclosure, the mobile device holder may be used to connect a wall to a pole. The pole may be configured to support the wall, such as at a retail checkout, service wall, customer service or purchase station. The pole may include connections to the wall, such as for electrical power and/or network connections.

According to at least one embodiment of the present disclosure, the mobile device holder may be used to connect a countertop (e.g., a horizontal surface, a divider, a partition, a smart countertop, electronic message/monitor/display) to a credit card payment terminal. For example, a countertop may be connected, using the mobile device holder, to a credit card terminal such as, but not limited to, a Miura M010®, a VeriFone e355®, or an Ingenico iSMP4®. The countertop and the credit card payment terminal, combined by the mobile device holder, allow a user to take and receive credit card payments through the credit card terminal.

According to at least one embodiment of the present disclosure, the mobile device holder may be used to connect a countertop to a scanner device. The scanner device could be for example, a bar code scanner, a QR-code scanner, or an image scanner. The countertop and the scanner, combined by the mobile device holder, allows a user to scan items, bar or QR-codes, or other images and upload them for further processing. The further processing may include communication via the Internet, inventory or product control, quality control, or another operation or procedure that may require the use of a scanner and the countertop.

According to at least one embodiment of the present disclosure, the mobile device holder may be used to connect a countertop to a thermometer. For example, in a medical situation, a medical staffer, such as a nurse or doctor, may connect a countertop to a thermometer for the purpose of measuring the temperature of a patient. The thermometer may be in wireless communication with (or physically connected to) the countertop to immediately upload the measured temperature to the electronic file of the patient. In another example, the thermometer may be used in a commercial situation, such as in a food service situation. A user may use the thermometer to measure the temperatures of food items in a kitchen which may then be communicated to the countertop for record keeping. In yet another example, the thermometer may be used in an industrial situation, such as a manufacturing plant. The thermometer may be used to measure the temperatures of work in process or other temperature sensitive areas or equipment and record that information to the attached countertop.

According to at least one embodiment of the present disclosure, the mobile device holder may be used to connect a countertop to a measurement device. The measurement device may be laser distance measuring device, for example. The measurement device may be electronically connected to the countertop as well as physically connected via the mobile device holder. Measurements made using the measurement device may be communicated to the attached countertop and further utilized by one or more applications of the countertop. For example, an architect may use the measuring device to measure the size of rooms of a structure in order to generate a CAD data file of the structure.

According to at least one embodiment of the present disclosure, the mobile device holder may be used to connect a countertop to a battery. The battery may be configured to connect to the countertop (such as by a cable or wirelessly (i.e., inductively)) to provide electrical power to the computer. The combined countertop and battery may then provide the user of the wall with extended operational time due to the externally mounted (via the mobile device holder) battery supplementing the internal battery of the countertop.

According to at least one embodiment of the present disclosure, the mobile device holder may be used to connect a countertop to a light source. The light source may be configured as a light emitting diode (LED) and may be electrically operable by the countertop. The light source may be mounted relative to the countertop via the mobile device holder that the light source may be used as a flashlight. The light source may also be configured to operate in cooperation with an onboard camera of the countertop and positioned by the mobile device holder out of the view of the onboard camera.

According to at least one embodiment of the present disclosure, the mobile device holder may be used to connect a countertop to a card bay. The card bay may be used to store a plurality of cards, such as but not limited to loyalty cards, gift cards, store credit cards, coupons, hotel room key cards, security pass/door access key cards, identification cards, passports and passport cards, airline and other travel cards (i.e., boarding passes, train tickets, etc.). It is understood that the card bay may be configured to hold other items apart from card-based items.

According to at least one embodiment of the present disclosure, the mobile device holder may be used to connect a countertop to a pen holder. The pen holder may include an electronic pen (i.e., stylus) that may be configured to operate with the countertop and/or other devices and surfaces. The pen holder may secure the pen and keep the pen in close proximity to the countertop via the mobile device holder.

According to at least one embodiment of the present disclosure, the mobile device holder may be used to connect a countertop to a shoulder strap. The shoulder strap may be configured to engage the shoulder of a user and allow the user to carry the countertop "hands free". The mobile device holder allows the shoulder strap to be connected to the countertop in a plurality of configurations or positions.

According to at least one embodiment of the present disclosure, the mobile device holder may be used to connect a countertop to a hand strap. The hand strap may be configured to engage the hand of a user and allow the user to carry the countertop while leaving the user's hands open and available for other tasks or operations. The mobile device holder allows the hand strap to be connected to the countertop in a plurality of configurations or positions.

According to at least one embodiment of the present disclosure, the mobile device holder may be used to connect a countertop to at least a portion of a docking station. The docking station may be configured to receive the countertop and provide physical support for the countertop. Additionally, and alternatively the docking station may include electrical connections to the countertop to provide electrical power (i.e., operate the countertop and/or charge the battery of the countertop) as well as secure wired communication between the countertop and the docking station (as well as network connected to the docking station).

According to at least one embodiment of the present disclosure, the mobile device holder may be used to connect a countertop to a support stand. The support stand may be configured to support the countertop, such as but not limited to on a horizontal surface. The support stand may be adjustable to change the orientation of the countertop.

According to at least one embodiment of the present disclosure, the mobile device holder may be used to connect a countertop to a pole. The pole may be configured to support the countertop, such as at a retail checkout, service countertop, customer service or purchase station. The pole may include connections to the countertop, such as for electrical power and/or network connections.

According to at least one embodiment of the present disclosure, the mobile device holder may be used to connect a tablet case for a tablet computer (e.g., a protective tablet case, a tablet case with additional features) to a credit card payment terminal. For example a tablet case may be connected, using the mobile device holder, to a credit card terminal such as, but not limited to, a Miura M010®, a VeriFone e355®, or an Ingenico iSMP4®.

The tablet case and the credit card payment terminal, combined by the mobile device holder, allow a user to take and receive credit card payments through the credit card terminal.

According to at least one embodiment of the present disclosure, the mobile device holder may be used to connect a tablet case to a scanner device. The scanner device could be for example, a bar code scanner, a QR-code scanner, or an image scanner. The tablet case and the scanner, combined by the mobile device holder, allows a user to scan items, bar or QR-codes, or other images and upload them for further processing. The further processing may include communication via the Internet, inventory or product control, quality control, or another operation or procedure that may require the use of a scanner and the tablet case.

According to at least one embodiment of the present disclosure, the mobile device holder may be used to connect a tablet case to a thermometer. For example, in a medical situation, a medical staffer, such as a nurse or doctor, may connect a tablet case to a thermometer for the purpose of measuring the temperature of a patient. The thermometer may be in wireless communication with (or physically connected to) the tablet case to immediately upload the measured temperature to the electronic file of the patient. In another example, the thermometer may be used in a commercial situation, such as in a food service situation. A user may use the thermometer to measure the temperatures of food items in a kitchen which may then be communicated to the tablet case for record keeping. In yet another example, the thermometer may be used in an industrial situation, such as a manufacturing plant. The thermometer may be used to measure the temperatures of work in process or other temperature sensitive areas or equipment and record that information to the attached tablet case.

According to at least one embodiment of the present disclosure, the mobile device holder may be used to connect a tablet case to a measurement device. The measurement device may be laser distance measuring device, for example. The measurement device may be electronically connected to the tablet case as well as physically connected via the mobile device holder. Measurements made using the measurement device may be communicated to the attached tablet case and further utilized by one or more applications of the tablet case. For example, an architect may use the measuring device to measure the size of rooms of a structure in order to generate a CAD data file of the structure.

According to at least one embodiment of the present disclosure, the mobile device holder may be used to connect a tablet case to a battery. The battery may be configured to connect to the tablet case (such as by a cable or wirelessly (i.e., inductively)) to provide electrical power to the tablet computer. The combined tablet case and battery may then provide the user of the wall with extended operational time due to the externally mounted (via the mobile device holder) battery supplementing the internal battery of the tablet computer.

According to at least one embodiment of the present disclosure, the mobile device holder may be used to connect a tablet case to a light source. The light source may be configured as a light emitting diode (LED) and may be electrically operable by the tablet case. The light source may be mounted relative to the tablet case via the mobile device holder that the light source may be used as a flashlight. The light source may also be configured to operate in cooperation with an onboard camera of the tablet case and positioned by the mobile device holder out of the view of the onboard camera.

According to at least one embodiment of the present disclosure, the mobile device holder may be used to connect a tablet case to a card bay. The card bay may be used to store a plurality of cards, such as but not limited to loyalty cards, gift cards, store credit cards, coupons, hotel room key cards, security pass/door access key cards, identification cards, passports and passport cards, airline and other travel cards (i.e., boarding passes, train tickets, etc.). It is understood that the card bay may be configured to hold other items apart from card-based items.

According to at least one embodiment of the present disclosure, the mobile device holder may be used to connect a tablet case to a pen holder. The pen holder may include an electronic pen (i.e., stylus) that may be configured to operate with the tablet case and/or other devices and surfaces. The pen holder may secure the pen and keep the pen in close proximity to the tablet case via the mobile device holder.

According to at least one embodiment of the present disclosure, the mobile device holder may be used to connect a tablet case to a shoulder strap. The shoulder strap may be configured to engage the shoulder of a user and allow the user to carry the tablet case "hands free". The mobile device holder allows the shoulder strap to be connected to the tablet case in a plurality of configurations or positions.

According to at least one embodiment of the present disclosure, the mobile device holder may be used to connect a tablet case to a hand strap. The hand strap may be configured to engage the hand of a user and allow the user to carry the tablet case while leaving the user's hands open and available for other tasks or operations. The mobile device holder allows the hand strap to be connected to the tablet case in a plurality of configurations or positions.

According to at least one embodiment of the present disclosure, the mobile device holder may be used to connect a tablet case to at least a portion of a docking station. The docking station may be configured to receive the tablet case and provide physical support for the tablet case. Additionally and alternatively, the docking station may include electrical connections to the tablet case to provide electrical power (i.e., operate the tablet case and/or charge the battery of the tablet case) as well as secure wired communication between the tablet case and the docking station (as well as network connected to the docking station).

According to at least one embodiment of the present disclosure, the mobile device holder may be used to connect a tablet case to a support stand. The support stand may be configured to support the tablet case, such as but not limited to on a horizontal surface. The support stand may be adjustable to change the orientation of the tablet case.

According to at least one embodiment of the present disclosure, the mobile device holder may be used to connect a tablet case to a pole. The pole may be configured to support the tablet case, such as at a retail checkout, service tablet case, customer service or purchase station. The pole may include connections to the tablet case, such as for electrical power and/or network connections.

According to at least one embodiment of the present disclosure, the mobile device holder may be used to connect a bag or container, such as a nylon (polymer) bag or bag made of another suitable material connected to a credit card terminal. Other containers are also contemplated such as a backpack, duffel bag, smart bag with Internet and/or other computing activity, purse, briefcase, luggage that may be connected to a credit card payment terminal. For example, a nylon bag may be connected, using the mobile device holder, to a credit card terminal such as, but not limited to, a Miura M010®, a VeriFone e355®, or an Ingenico iSMP4®. The nylon bag and the credit card payment terminal, combined by the mobile device holder, allow a user to take and receive credit card payments through the credit card terminal.

According to at least one embodiment of the present disclosure, the mobile device holder may be used to connect a nylon bag to a scanner device. The scanner device could be for example, a bar code scanner, a QR-code scanner, or an image scanner. The nylon bag and the scanner, combined by the mobile device holder, allows a user to scan items, bar or QR-codes, or other images and upload them for further processing. The further processing may include communication via the Internet, inventory or product control, quality control, or another operation or procedure that may require the use of a scanner and the nylon bag.

According to at least one embodiment of the present disclosure, the mobile device holder may be used to connect a nylon bag to a thermometer. For example, in a medical situation, a medical staffer, such as a nurse or doctor, may connect a nylon bag to a thermometer for the purpose of measuring the temperature of a patient. The thermometer may be in wireless communication with (or physically connected to) the nylon bag to immediately upload the measured temperature to the electronic file of the patient. In another example, the thermometer may be used in a commercial situation, such as in a food service situation. A user may use the thermometer to measure the temperatures of food items in a kitchen which may then be communicated to the nylon bag for record keeping. In yet another example, the thermometer may be used in an industrial situation, such as a manufacturing plant. The thermometer may be used to measure the temperatures of work in process or other temperature sensitive areas or equipment and record that information to the attached nylon bag.

According to at least one embodiment of the present disclosure, the mobile device holder may be used to connect a nylon bag to a measurement device. The measurement device may be laser distance measuring device, for example. The measurement device may be electronically connected to the nylon bag as well as physically connected via the mobile device holder. Measurements made using the measurement device may be communicated to the attached nylon bag and further utilized by one or more applications of the nylon bag. For example, an architect may use the measuring device to measure the size of rooms of a structure in order to generate a CAD data file of the structure.

According to at least one embodiment of the present disclosure, the mobile device holder may be used to connect a nylon bag to a battery. The battery may be configured to connect to the nylon bag (such as by a cable or wirelessly (i.e., inductively)) to provide electrical power to the nylon bag. The combined nylon bag and battery may then provide the user of the wall with extended operational time due to the externally mounted (via the mobile device holder) battery supplementing the internal battery of the nylon bag.

According to at least one embodiment of the present disclosure, the mobile device holder may be used to connect a nylon bag to a light source. The light source may be configured as a light emitting diode (LED) and may be electrically operable by the nylon bag. The light source may be mounted relative to the nylon bag via the mobile device holder that the light source may be used as a flashlight. The light source may also be configured to operate in cooperation with an onboard camera of the nylon bag and positioned by the mobile device holder out of the view of the onboard camera.

According to at least one embodiment of the present disclosure, the mobile device holder may be used to connect a nylon bag to a card bay. The card bay may be used to store a plurality of cards, such as but not limited to loyalty cards, gift cards, store credit cards, coupons, hotel room key cards, security pass/door access key cards, identification cards, passports and passport cards, airline and other travel cards (i.e., boarding passes, train tickets, etc.). It is understood that the card bay may be configured to hold other items apart from card-based items.

According to at least one embodiment of the present disclosure, the mobile device holder may be used to connect a nylon bag to a pen holder. The pen holder may include an electronic pen (i.e., stylus) that may be configured to operate with the nylon bag and/or other devices and surfaces. The pen holder may secure the pen and keep the pen in close proximity to the nylon bag via the mobile device holder.

According to at least one embodiment of the present disclosure, the mobile device holder may be used to connect a nylon bag to a shoulder strap. The shoulder strap may be configured to engage the shoulder of a user and allow the user to carry the nylon bag "hands free". The mobile device holder allows the shoulder strap to be connected to the nylon bag in a plurality of configurations or positions.

According to at least one embodiment of the present disclosure, the mobile device holder may be used to connect a nylon bag to a hand strap. The hand strap may be configured to engage the hand of a user and allow the user to carry the nylon bag while leaving the user's hands open and available for other tasks or operations. The mobile device holder allows the hand strap to be connected to the nylon bag in a plurality of configurations or positions.

According to at least one embodiment of the present disclosure, the mobile device holder may be used to connect a nylon bag to at least a portion of a docking station. The docking station may be configured to receive the nylon bag and provide physical support for the nylon bag. Additionally and alternatively, the docking station may include electrical connections to the nylon bag to provide electrical power (i.e., operate the nylon bag and/or charge the battery of the nylon bag) as well as secure wired communication between the nylon bag and the docking station (as well as network connected to the docking station).

According to at least one embodiment of the present disclosure, the mobile device holder may be used to connect a nylon bag to a support stand. The support stand may be configured to support the nylon bag, such as but not limited to on a horizontal surface. The support stand may be adjustable to change the orientation of the nylon bag.

According to at least one embodiment of the present disclosure, the mobile device holder may be used to connect a nylon bag to a pole. The pole may be configured to support the nylon bag, such as at a retail checkout, service nylon bag, customer service or purchase station. The pole may include connections to the nylon bag, such as for electrical power and/or network connections.

According to at least one embodiment of the present disclosure, the mobile device holder may be used to connect a holster (e.g., a sheath, a belt, a device holster, a smart holster with Internet and/or other computing activity) to a credit card payment terminal. For example, a holster may be connected, using the mobile device holder, to a credit card terminal such as, but not limited to, a Miura M010®, a VeriFone e355®, or an Ingenico iSMP4®. The holster and the credit card payment terminal, combined by the mobile device holder, allow a user to take and receive credit card payments through the credit card terminal.

According to at least one embodiment of the present disclosure, the mobile device holder may be used to connect a holster to a scanner device. The scanner device could be for example, a bar code scanner, a QR-code scanner, or an image scanner. The holster and the scanner, combined by the mobile device holder, allows a user to scan items, bar or QR-codes, or other images and upload them for further processing. The further processing may include communication via the Internet, inventory or product control, quality control, or another operation or procedure that may require the use of a scanner and the holster.

According to at least one embodiment of the present disclosure, the mobile device holder may be used to connect a holster to a thermometer. For example, in a medical situation, a medical staffer, such as a nurse or doctor, may connect a holster to a thermometer for the purpose of measuring the temperature of a patient. The thermometer may be in wireless communication with (or physically connected to) the holster to immediately upload the measured temperature to the electronic file of the patient. In another example, the thermometer may be used in a commercial situation, such as in a food service situation. A user may use the thermometer to measure the temperatures of food items in a kitchen which may then be communicated to the holster for record keeping. In yet another example, the thermometer may be used in an industrial situation, such as a manufacturing plant. The thermometer may be used to measure the temperatures of work in process or other temperature sensitive areas or equipment and record that information to the attached holster.

According to at least one embodiment of the present disclosure, the mobile device holder may be used to connect a holster to a measurement device. The measurement device may be laser distance measuring device, for example. The measurement device may be electronically connected to the holster as well as physically connected via the mobile device holder. Measurements made using the measurement device may be communicated to the attached holster and further utilized by one or more applications of the holster. For example, an architect may use the measuring device to measure the size of rooms of a structure in order to generate a CAD data file of the structure.

According to at least one embodiment of the present disclosure, the mobile device holder may be used to connect a holster to a battery. The battery may be configured to connect to the holster (such as by a cable or wirelessly (i.e., inductively)) to provide electrical power to the holster. The combined holster and battery may then provide the user of the wall with extended operational time due to the externally mounted (via the mobile device holder) battery supplementing the internal battery of the holster.

According to at least one embodiment of the present disclosure, the mobile device holder may be used to connect a holster to a light source. The light source may be configured as a light emitting diode (LED) and may be electrically operable by the holster. The light source may be mounted relative to the holster via the mobile device holder that the light source may be used as a flashlight. The light source may also be configured to operate in cooperation with an onboard camera of the holster and positioned by the mobile device holder out of the view of the onboard camera.

According to at least one embodiment of the present disclosure, the mobile device holder may be used to connect a holster to a card bay. The card bay may be used to store a plurality of cards, such as but not limited to loyalty cards, gift cards, store credit cards, coupons, hotel room key cards, security pass/door access key cards, identification cards, passports and passport cards, airline and other travel cards (i.e., boarding passes, train tickets, etc.). It is understood that the card bay may be configured to hold other items apart from card-based items.

According to at least one embodiment of the present disclosure, the mobile device holder may be used to connect a holster to a pen holder. The pen holder may include an electronic pen (i.e., stylus) that may be configured to operate with the holster and/or other devices and surfaces. The pen holder may secure the pen and keep the pen in close proximity to the holster via the mobile device holder.

According to at least one embodiment of the present disclosure, the mobile device holder may be used to connect a holster to a shoulder strap. The shoulder strap may be configured to engage the shoulder of a user and allow the user to carry the holster "hands free". The mobile device holder allows the shoulder strap to be connected to the holster in a plurality of configurations or positions.

According to at least one embodiment of the present disclosure, the mobile device holder may be used to connect a holster to a hand strap. The hand strap may be configured to engage the hand of a user and allow the user to carry the holster while leaving the user's hands open and available for other tasks or operations. The mobile device holder allows the hand strap to be connected to the holster in a plurality of configurations or positions.

According to at least one embodiment of the present disclosure, the mobile device holder may be used to connect a holster to at least a portion of a docking station. The docking station may be configured to receive the holster and provide physical support for the holster. Additionally, and alternatively the docking station may include electrical connections to the holster to provide electrical power (i.e., operate the holster and/or charge the battery of the holster) as well as secure wired communication between the holster and the docking station (as well as network connected to the docking station).

According to at least one embodiment of the present disclosure, the mobile device holder may be used to connect a holster to a support stand. The support stand may be configured to support the holster, such as but not limited to on a horizontal surface. The support stand may be adjustable to change the orientation of the holster.

According to at least one embodiment of the present disclosure, the mobile device holder may be used to connect a holster to a pole. The pole may be configured to support the holster, such as at a retail checkout, service holster, customer service or purchase station. The pole may include connections to the holster, such as for electrical power and/or network connections.

According to at least one embodiment of the present disclosure, the mobile device holder may be used to connect a vehicle (e.g., an automobile, an autonomous vehicle, a drone, a naval craft, an aircraft, a train/subway, a bicycle) to a credit card payment terminal. It should be understood that the term vehicle as used herein includes a transportation device that may be configured to move passengers, cargo, a combination thereof, or empty (without passengers or cargo). For example, a vehicle may be connected, using the mobile device holder, to a credit card terminal such as, but not limited to, a Miura M010®, a VeriFone e355®, or an Ingenico iSMP4®. The vehicle and the credit card payment terminal, combined by the mobile device holder, allow a user to take and receive credit card payments through the credit card terminal.

According to at least one embodiment of the present disclosure, the mobile device holder may be used to connect a vehicle to a scanner device. The scanner device could be for example, a bar code scanner, a QR-code scanner, or an image scanner. The vehicle and the scanner, combined by the mobile device holder, allows a user to scan items, bar or QR-codes, or other images and upload them for further processing. The further processing may include communication via the Internet, inventory or product control, quality control, or another operation or procedure that may require the use of a scanner and the vehicle.

According to at least one embodiment of the present disclosure, the mobile device holder may be used to connect a vehicle to a thermometer. For example, in a medical situation, a medical staffer, such as a nurse or doctor, may connect a vehicle to a thermometer for the purpose of measuring the temperature of a patient. The thermometer may be in wireless communication with (or physically connected to) the vehicle to immediately upload the measured temperature to the electronic file of the patient. In another example, the thermometer may be used in a commercial situation, such as in a food service situation. A user may use the thermometer to measure the temperatures of food items in a kitchen which may then be communicated to the vehicle for record keeping. In yet another example, the thermometer may be used in an industrial situation, such as a manufacturing plant. The thermometer may be used to measure the temperatures of work in process or other temperature sensitive areas or equipment and record that information to the attached vehicle.

According to at least one embodiment of the present disclosure, the mobile device holder may be used to connect a vehicle to a measurement device. The measurement device may be laser distance measuring device, for example. The measurement device may be electronically connected to the vehicle as well as physically connected via the mobile device holder. Measurements made using the measurement device may be communicated to the attached vehicle and further utilized by one or more applications of the vehicle. For example, an architect may use the measuring device to measure the size of rooms of a structure in order to generate a CAD data file of the structure.

According to at least one embodiment of the present disclosure, the mobile device holder may be used to connect a vehicle to a battery. The battery may be configured to connect to the vehicle (such as by a cable or wirelessly (i.e., inductively)) to provide electrical power to the vehicle. The combined vehicle and battery may then provide the user of the wall with extended operational time due to the externally mounted (via the mobile device holder) battery supplementing the internal battery of the vehicle.

According to at least one embodiment of the present disclosure, the mobile device holder may be used to connect a vehicle to a light source. The light source may be configured as a light emitting diode (LED) and may be electrically operable by the vehicle. The light source may be mounted relative to the vehicle via the mobile device holder that the light source may be used as a flashlight. The light source may also be configured to operate in cooperation with an onboard camera of the vehicle and positioned by the mobile device holder out of the view of the onboard camera.

According to at least one embodiment of the present disclosure, the mobile device holder may be used to connect a vehicle to a card bay. The card bay may be used to store a plurality of cards, such as but not limited to loyalty cards, gift cards, store credit cards, coupons, hotel room key cards, security pass/door access key cards, identification cards, passports and passport cards, airline and other travel cards (i.e., boarding passes, train tickets, etc.). It is understood that the card bay may be configured to hold other items apart from card-based items.

According to at least one embodiment of the present disclosure, the mobile device holder may be used to connect a vehicle to a pen holder. The pen holder may include an electronic pen (i.e., stylus) that may be configured to operate with the vehicle and/or other devices and surfaces. The pen holder may secure the pen and keep the pen in close proximity to the vehicle via the mobile device holder.

According to at least one embodiment of the present disclosure, the mobile device holder may be used to connect a vehicle to a shoulder strap. The shoulder strap may be configured to engage the shoulder of a user and allow the user to carry the vehicle "hands free". The mobile device holder allows the shoulder strap to be connected to the vehicle in a plurality of configurations or positions.

According to at least one embodiment of the present disclosure, the mobile device holder may be used to connect a vehicle to a hand strap. The hand strap may be configured to engage the hand of a user and allow the user to carry the vehicle while leaving the user's hands open and available for other tasks or operations. The mobile device holder allows the hand strap to be connected to the vehicle in a plurality of configurations or positions.

According to at least one embodiment of the present disclosure, the mobile device holder may be used to connect a vehicle to at least a portion of a docking station. The docking station may be configured to receive the vehicle and provide physical support for the vehicle. Additionally, and alternatively the docking station may include electrical connections to the vehicle to provide electrical power (i.e., operate the vehicle and/or charge the battery of the vehicle) as well as secure wired communication between the vehicle and the docking station (as well as network connected to the docking station).

According to at least one embodiment of the present disclosure, the mobile device holder may be used to connect a vehicle to a support stand. The support stand may be configured to support the vehicle, such as but not limited to on a horizontal surface. The support stand may be adjustable to change the orientation of the vehicle.

According to at least one embodiment of the present disclosure, the mobile device holder may be used to connect a vehicle to a pole. The pole may be configured to support the vehicle, such as at a retail checkout, service vehicle, customer service or purchase station. The pole may include connections to the vehicle, such as for electrical power and/or network connections.

Referring generally to the Figures, the mobile device holder 10, 10' and 10" of the present disclosure include a front face 12 and a back face 14. The front face 12 and the back face 14 are bounded by a top side 16, a bottom side 18, a right side 20 and a left side 22. The right side 20 and the left side 22 may include one or more planar sections 24 and concave sections 26. The concave sections 26 may be configured to receive one or more fingers of a user (not shown). While the figures in the present disclosure illustrate three concave sections 26 spaced between four planar sections 24 each on the right side 20 and the left side 22, it should be understood that more or less concave sections 26 and planar sections 24 may be included on the right side 20 and the left side 22. Additionally, and alternatively one or more concave sections 26 and planar sections 24 may be disposed on the top side 16 and the bottom side 18. The planar sections 24 and the concave sections 26 may be configured with grip enhancing elements, such as graining, knurling or include inserts such as rubber or other high-friction material to improve the ability of the user to grip the mobile device holder 10, 10' and 10".

According to at least one embodiment of the present disclosure, the mobile device holders 10, 10' and 10" may include one or more holes 28. The holes 28 may be through holes (i.e., extend from the front face 12 through to the back face 14, though in some embodiments it is contemplated that some or all of the holes 28 may not extend completely through from front face 12 to back face 14. The holes 28 may be configured to receive one or more threaded inserts 30 (see FIG. 1). The threaded inserts 30 may be configured to receive mechanical fasteners such as, but not limited to screws, bolts, or pins, or a combination thereof. It is contemplated that more than one type of mechanical fastener may be used with the threaded inserts 30. Additionally, and alternatively it is further contemplated that other securing devices may be used in place of the threaded inserts 3—threaded inserts 30 are therefore only exemplary and not limiting. For example, one or more threaded inserts 30 may be replaced by other mechanical fastening devices such as magnets, quick-release pins or other selectively-removable fastening devices and systems.

The threaded inserts 30 may be used to secure an electronic or non-electronic device 34 to the mobile device holder 10, 10' and 10". As detailed herein, the device 34 may be, for example and without limitation, one or more of: a tablet computer, a phone case, a cell/smart phone, a computer, a kiosk, a desk, a wall, a countertop, a tablet case, a nylon bag, or a holster. Additionally and alternatively, the device 34 may also be one or more of: a credit card terminal, a scanner, a smart phone, a thermometer, a measurement device, a battery, a light source, a card bay, a pen/stylus holder, a shoulder strap, a hand strap, a docking station, a stand, or a pole. The configuration of the holes 28 and/or the threaded inserts 30 may be configured to align with one or more mounting standards for one or more of the devices 34. The configuration of the holes 28 and/or the threaded inserts 30 may allow for more than one orientation of the device 34 relative to the mobile device holder 10, 10' and 10" (and the other device being held by the mobile device holder 10, 10' and 10").

Figure 3:
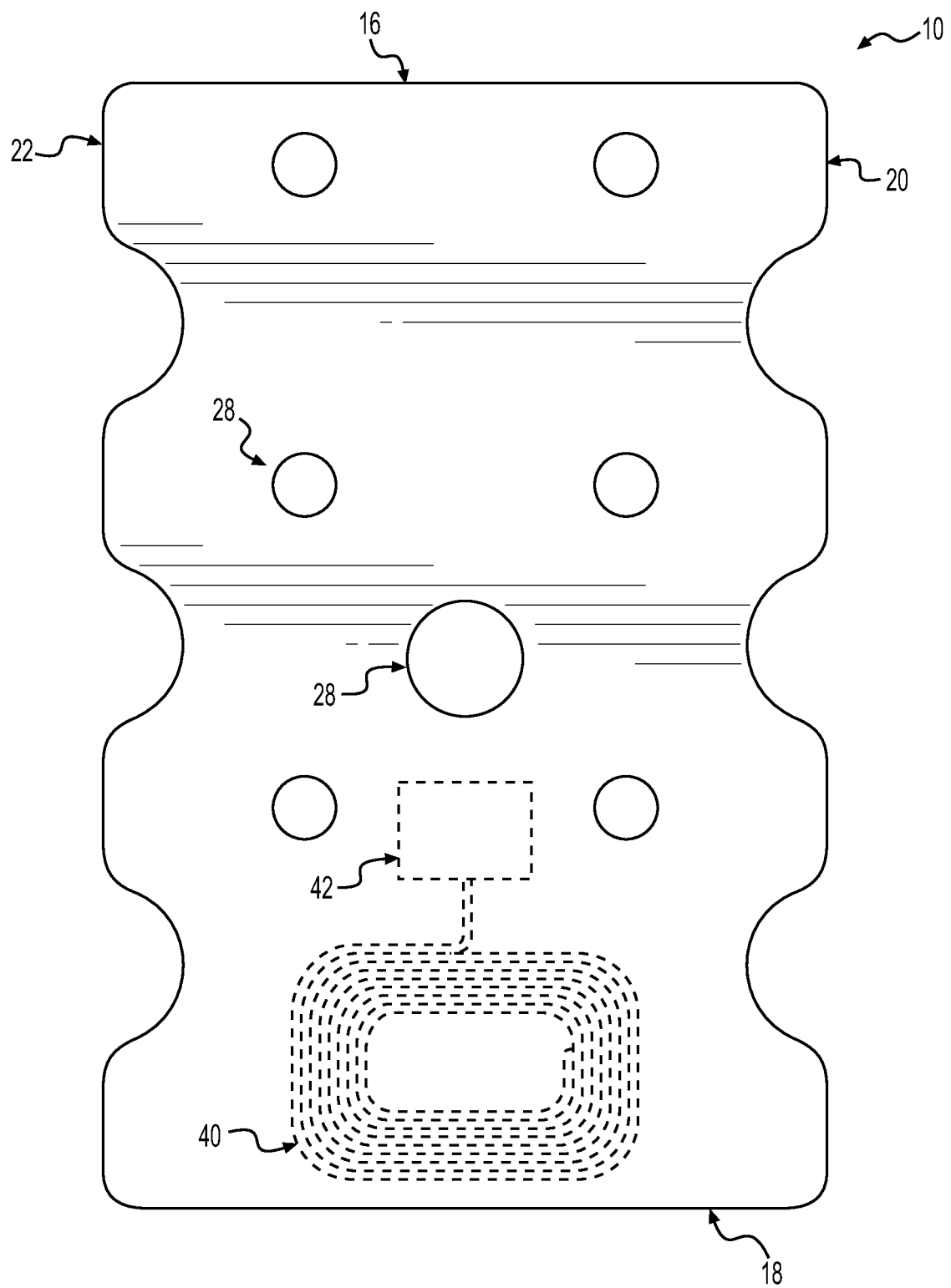
FIG. 3 is a front view of the embodiment of the present disclosure shown in FIG. 1 with a wireless (inductive) charging coil and wireless charging coil controller shown embedded within.
Figure 4:
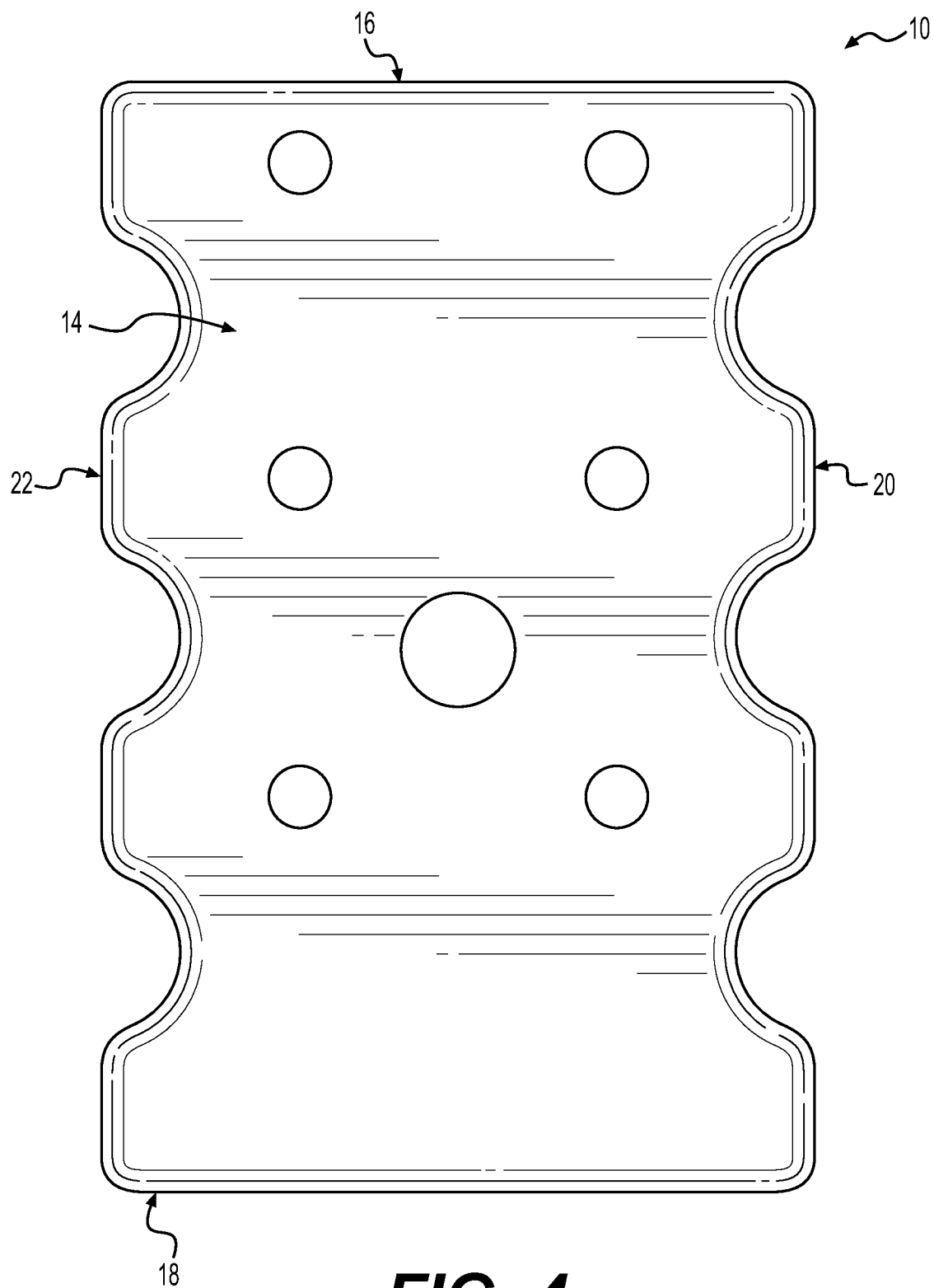
FIG. 4 is a rear view of the embodiment of the present disclosure shown in FIG. 1.
Figure 5:
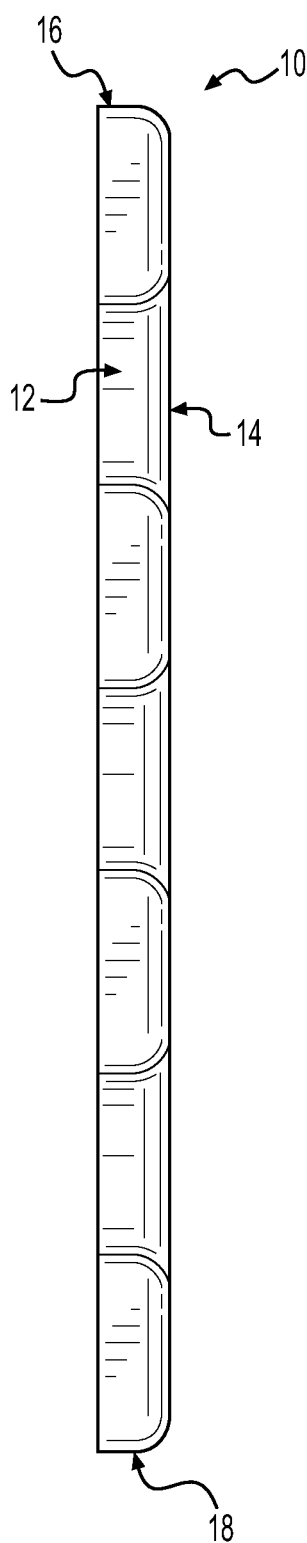
FIG. 5 is a right side view of the embodiment of the present disclosure shown in FIG. 1.
Figure 6:
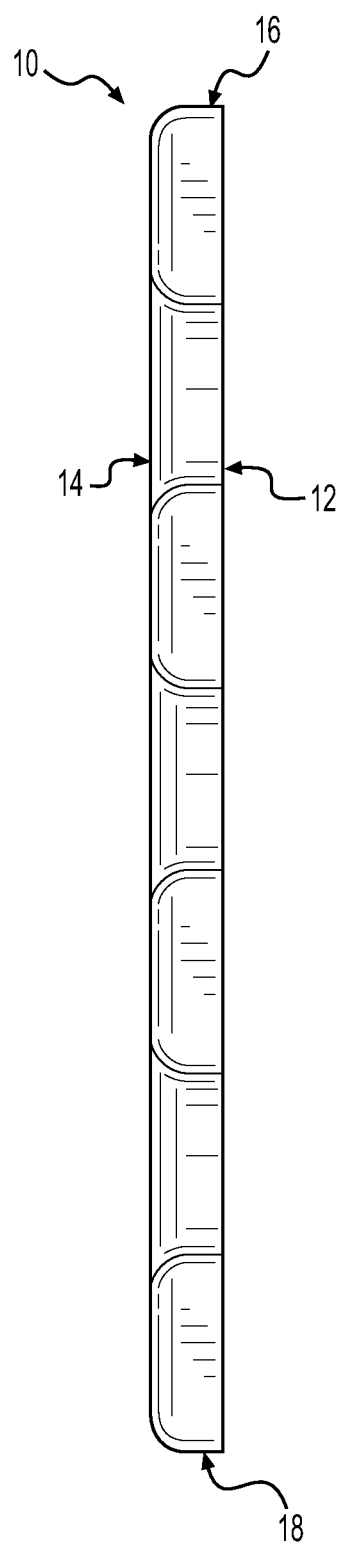
FIG. 6 is a left side view of the embodiment of the present disclosure shown in FIG. 1.
Figure 7:
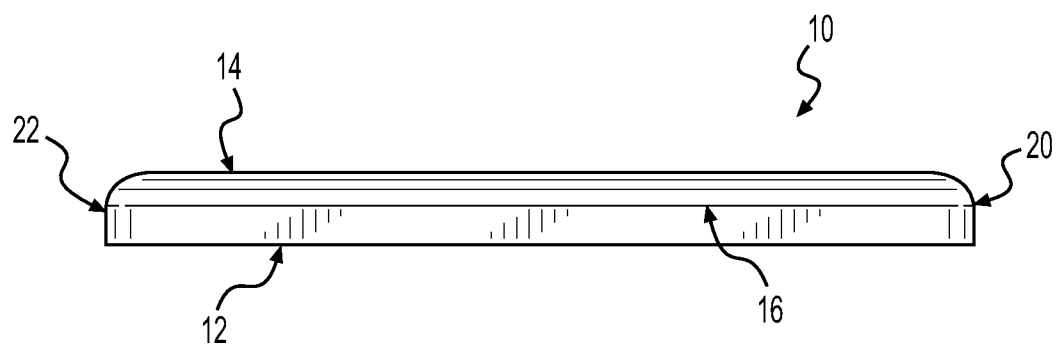
FIG. 7 is a top side view of the embodiment of the present disclosure shown in FIG. 1.
Figure 8:
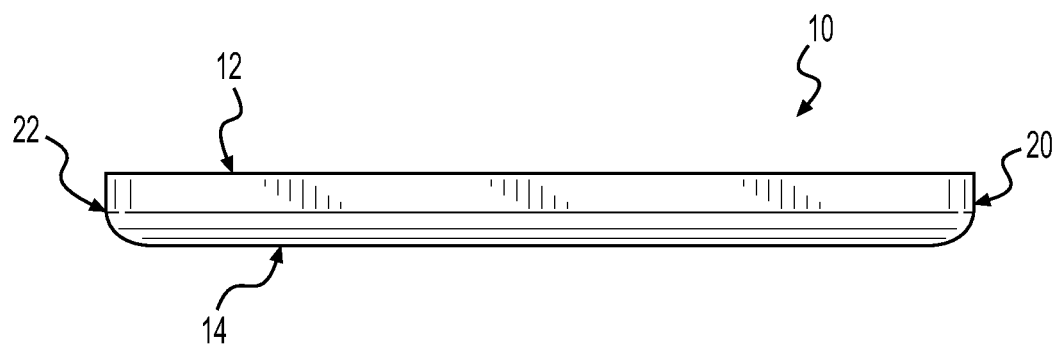
FIG. 8 is a bottom side view of the embodiment of the present disclosure shown in FIG. 1.

Referring now to FIG. 3, a mobile device holder 10, 10' and 10" is shown with an embedded inductive charging coil ("coil") 40 connected to an inductive charging coil controller ("controller") 42. According to one embodiment of the present disclosure, the coil 40 may be embedded along with the controller 42 within at least a portion of the mobile device holder 10, 10' and 10". It is contemplated that more than one coil 40 and at least one controller 42 may be disposed within the mobile device holder 10, 10' and 10". The coil 40 may be configured to wirelessly transmit (or conduct) electricity through the mobile device holder 10, 10' and 10" from a first electronic device to a second electronic device joined together by the mobile device holder 10, 10' and 10". In addition to the transmission of electricity, it is contemplated that the coil 40 and/or the controller 42 may be configured to allow other electronic communication to pass through the coil 40 and/or the controller 42 to allow the first electronic device and the second electronic device to communicate with each other. The communication may include, for example and without limitation, device identification, Internet communication, and/or data communication.

Figure 9:
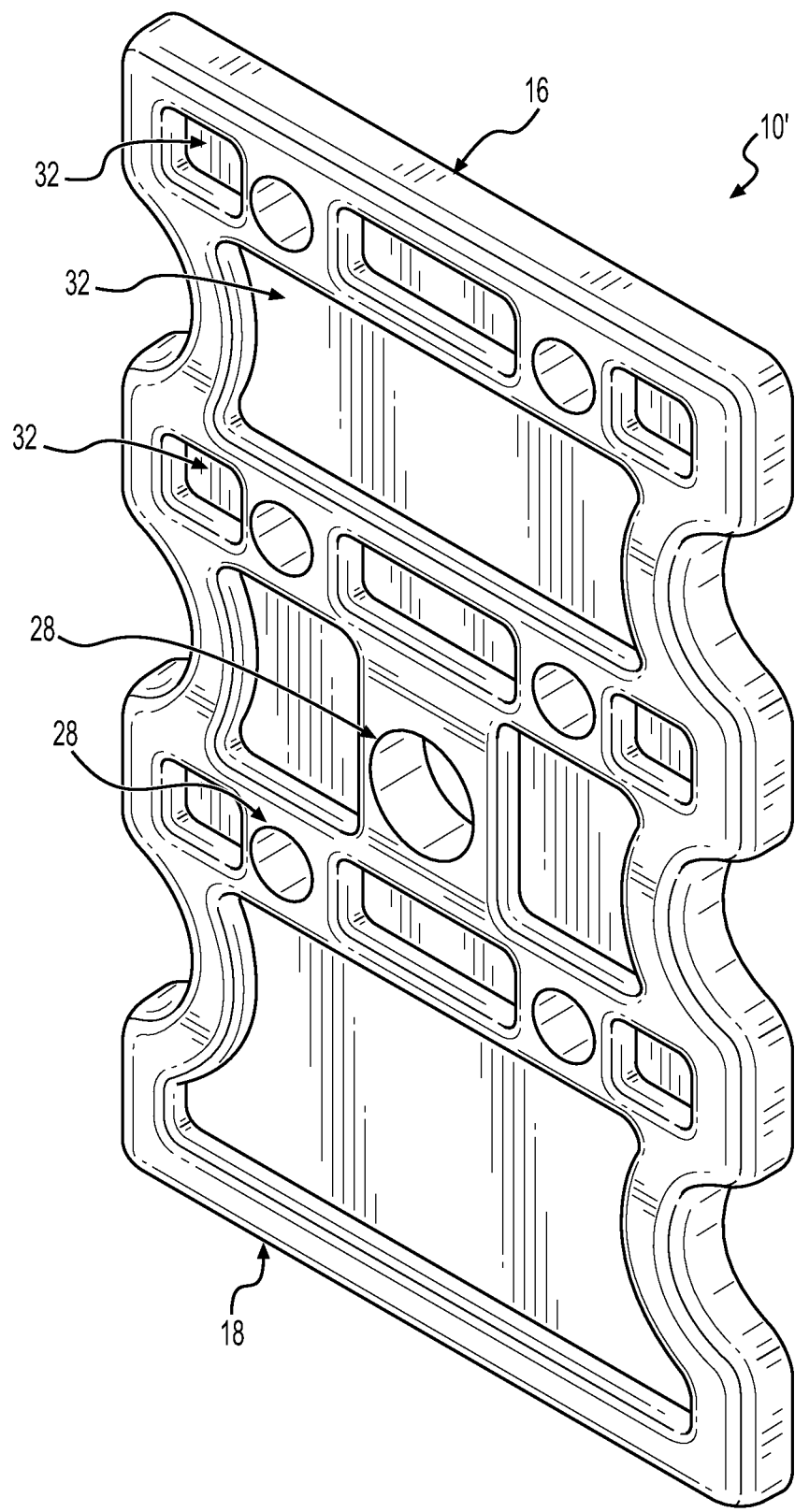
FIG. 9 is a front perspective view of a second embodiment of the present disclosure.
Figure 10:
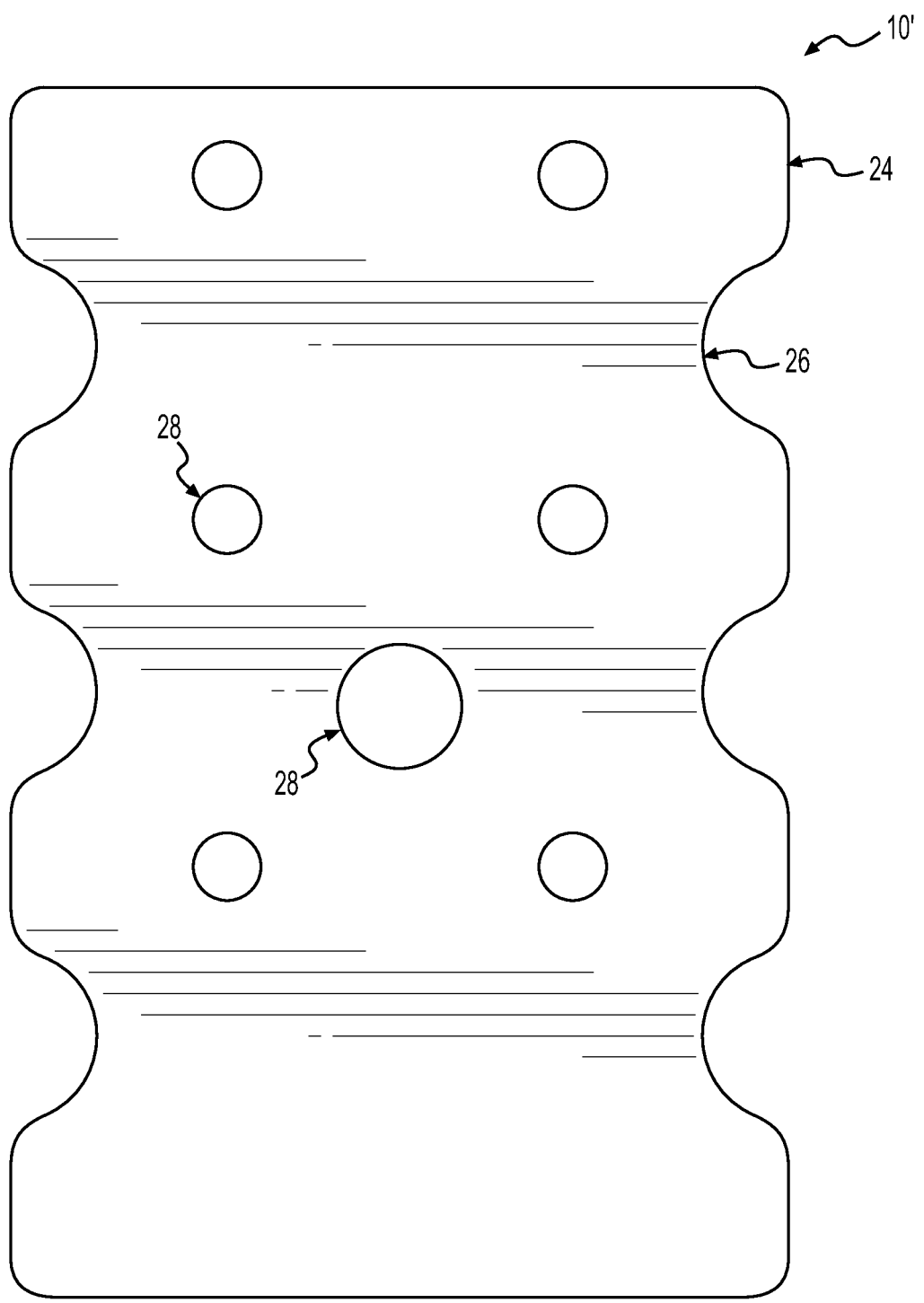
FIG. 10 is a rear view of the second embodiment of the present disclosure shown in FIG. 9.
Figure 11:
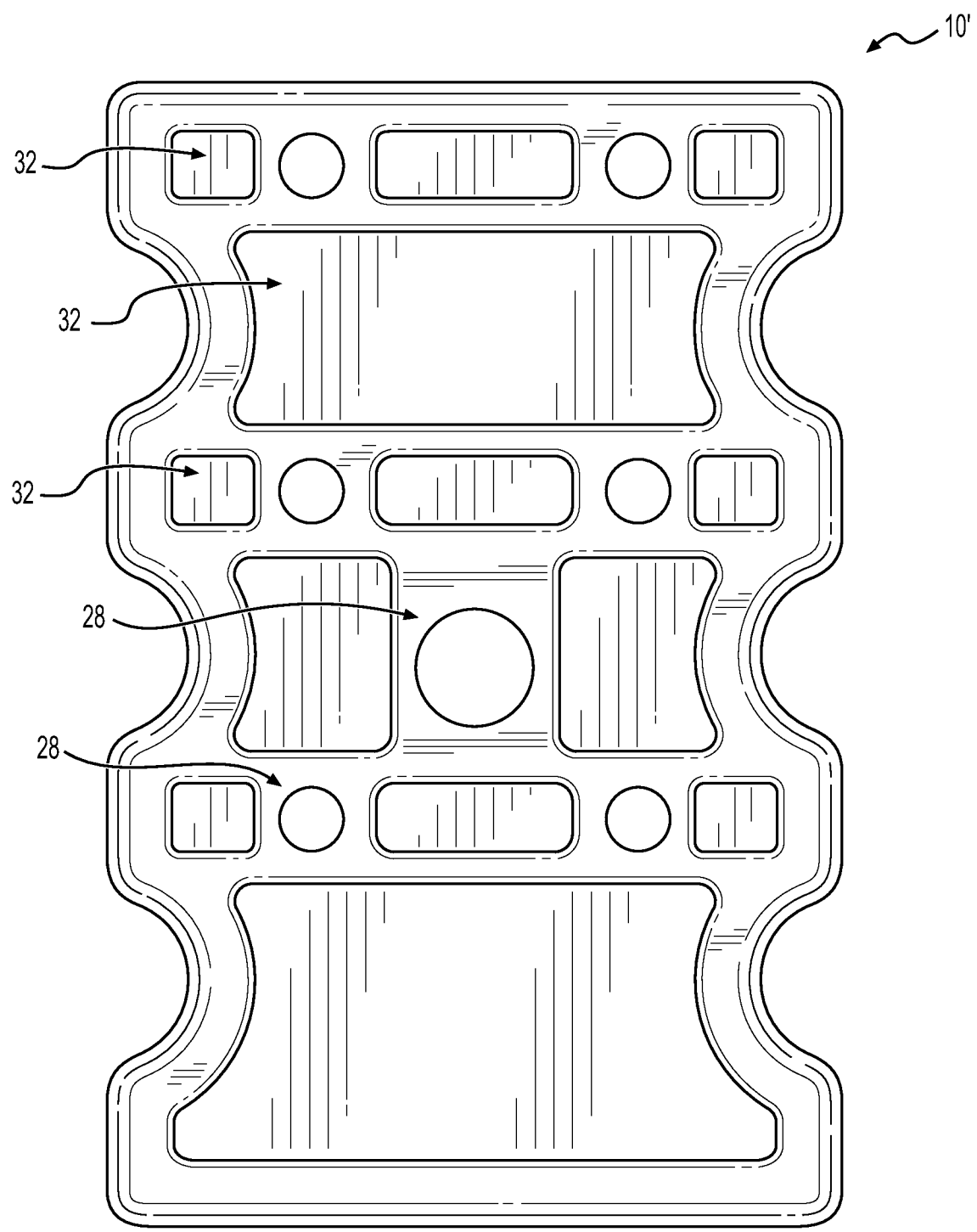
FIG. 11 is a front view of the second embodiment of the present disclosure shown in FIG. 9.
Figure 12:
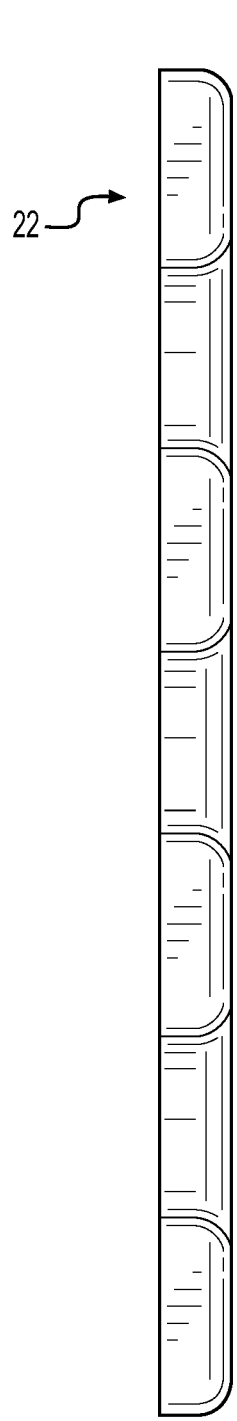
FIG. 12 is a right side view of the second embodiment of the present disclosure shown in FIG. 9.
Figure 13:
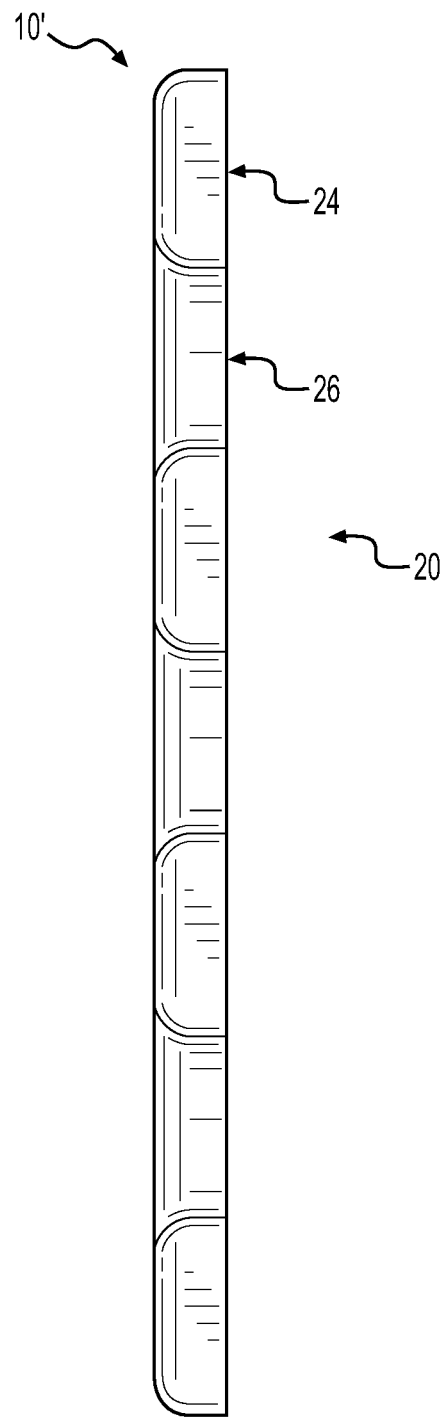
FIG. 13 is a left side view of the second embodiment of the present disclosure shown in FIG. 9.
Figure 14:
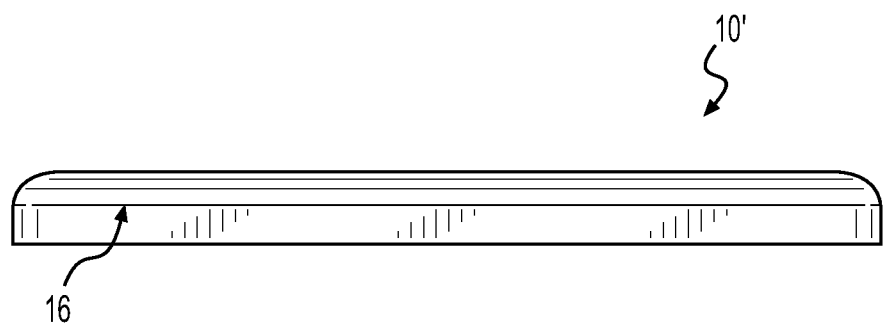
FIG. 14 is a top side view of the second embodiment of the present disclosure shown in FIG. 9.
Figure 15:
FIG. 15 is a rear side view of the second embodiment of the present disclosure shown in FIG. 9.

Referring now to FIGS. 9 and 11, a mobile device holder 10' according to an embodiment of the present disclosure is shown. Mobile device holder 10' may include one or more recessed sections 32 disposed on at least one of the front face 12, back face 14, top side 16, bottom side 18, right side 20, and/or the left side 22. The recessed sections 32 may be configured due to manufacturing processes (i.e., injection molding) or the recessed sections 32 may be included for engineering processes (i.e., strength or reduction in weight) or finally for appearance (i.e., to incorporate a logo or other design).

Figure 16:
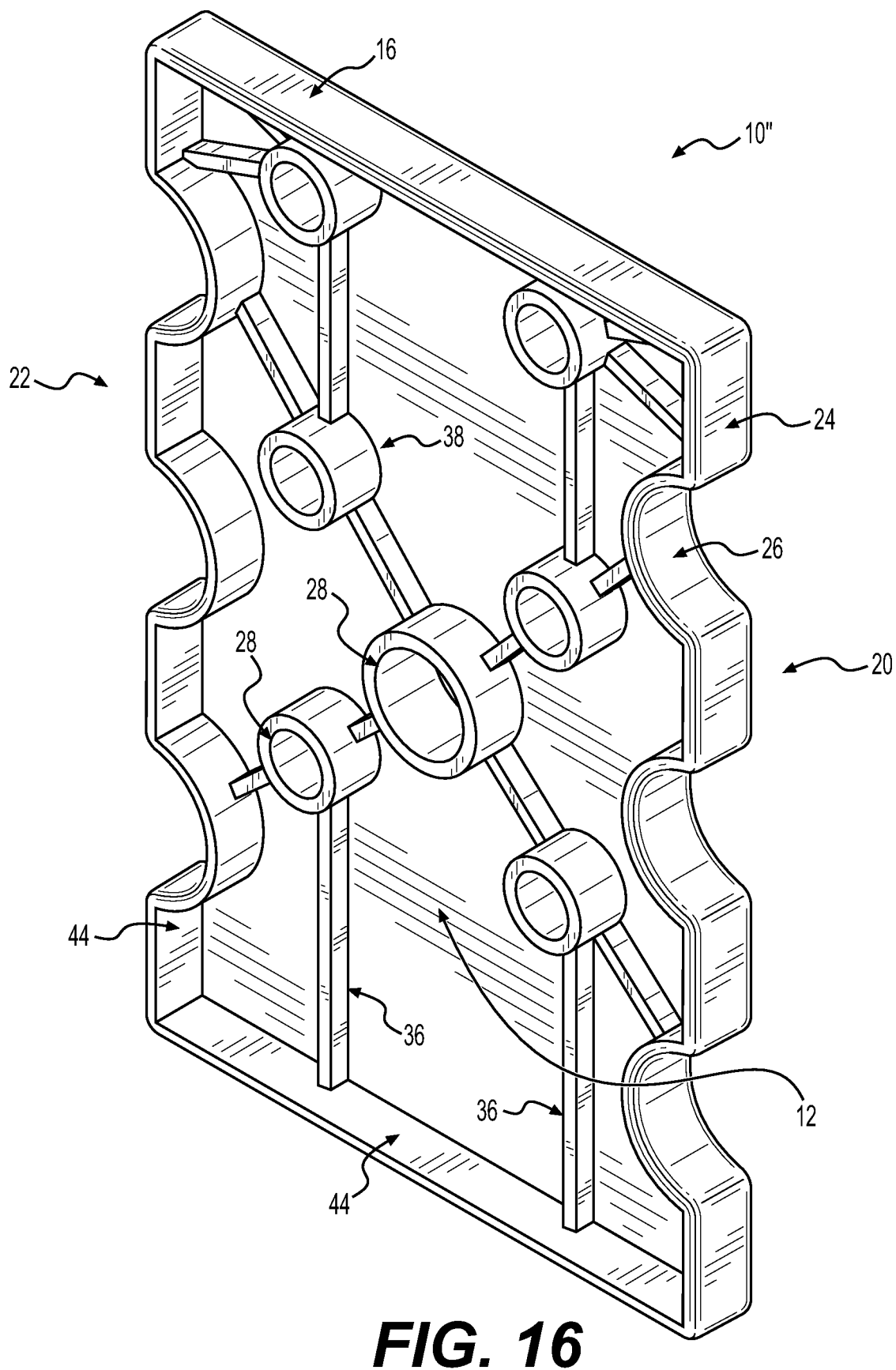
FIG. 16 is a front perspective view of a third embodiment of the present disclosure.
Figure 17:
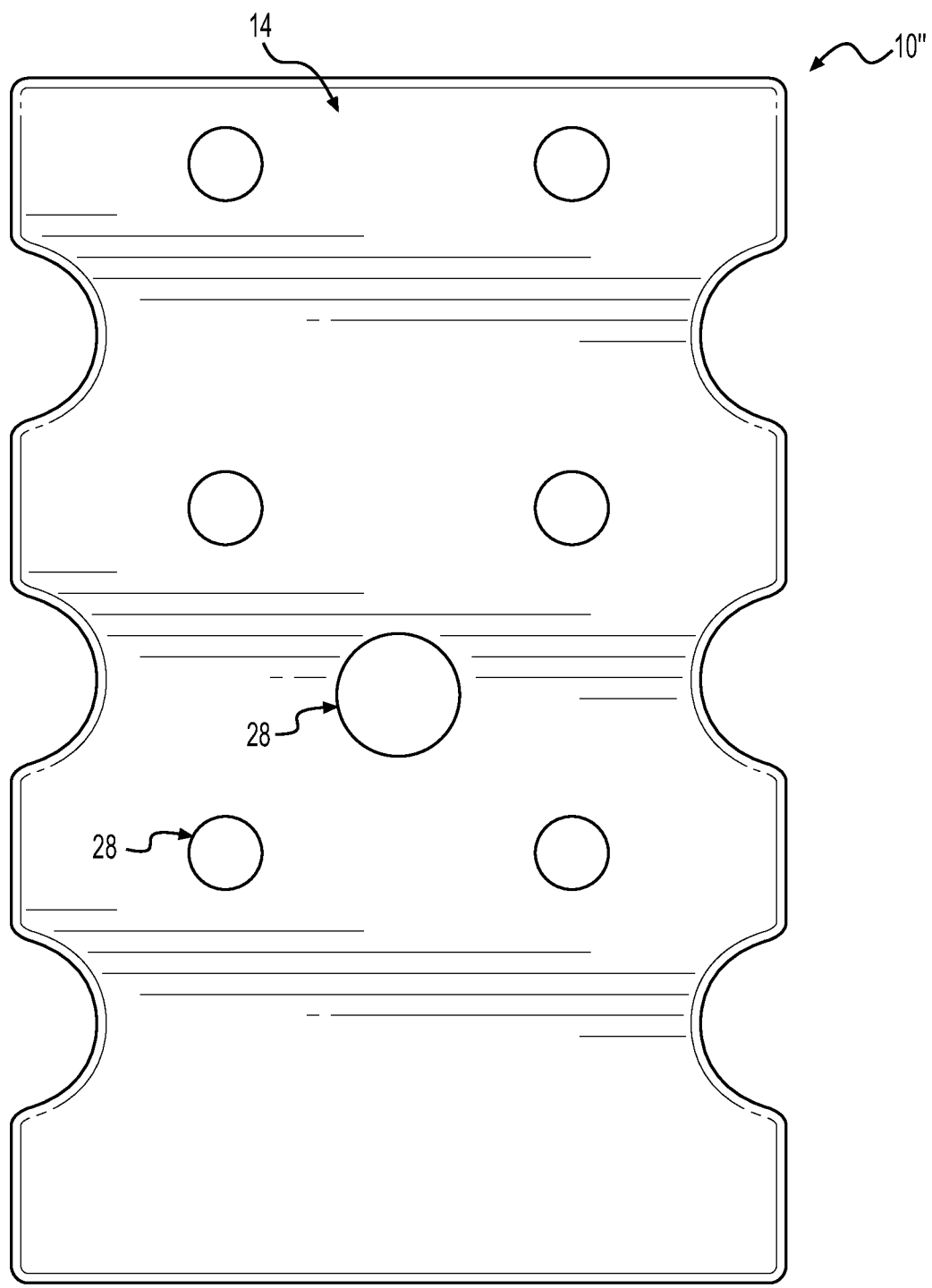
FIG. 17 is a rear view of the third embodiment of the present disclosure shown in FIG. 16.
Figure 18:
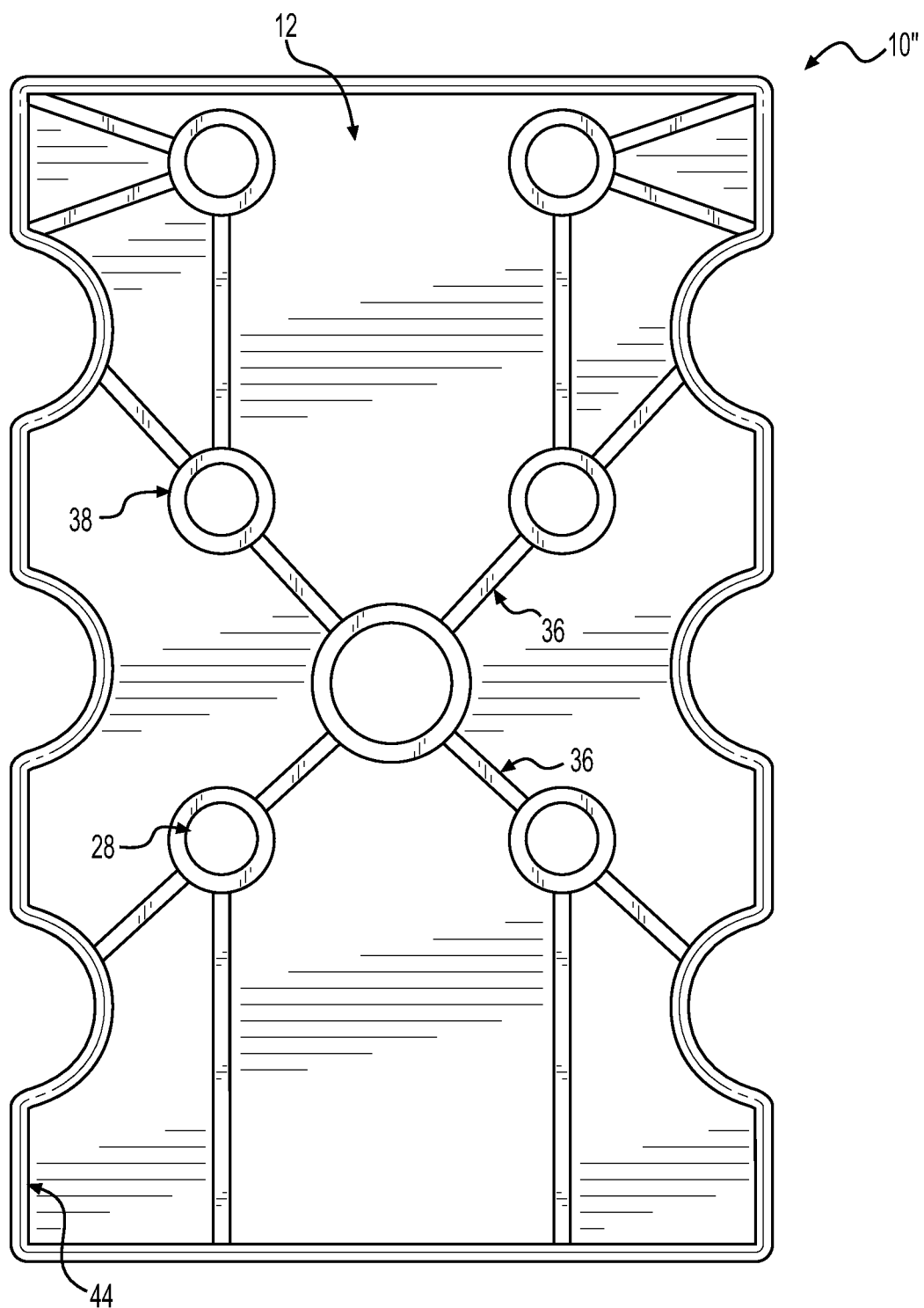
FIG. 18 is a front view of the third embodiment of the present disclosure shown in FIG. 16.
Figure 19:
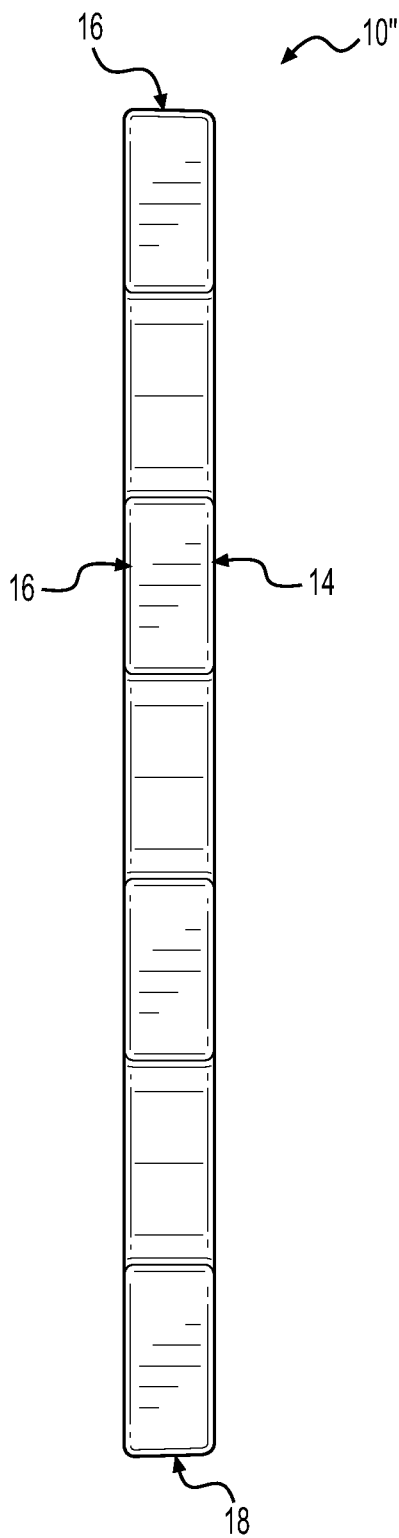
FIG. 19 is a right side view of the third embodiment of the present disclosure shown in FIG. 16.
Figure 20:
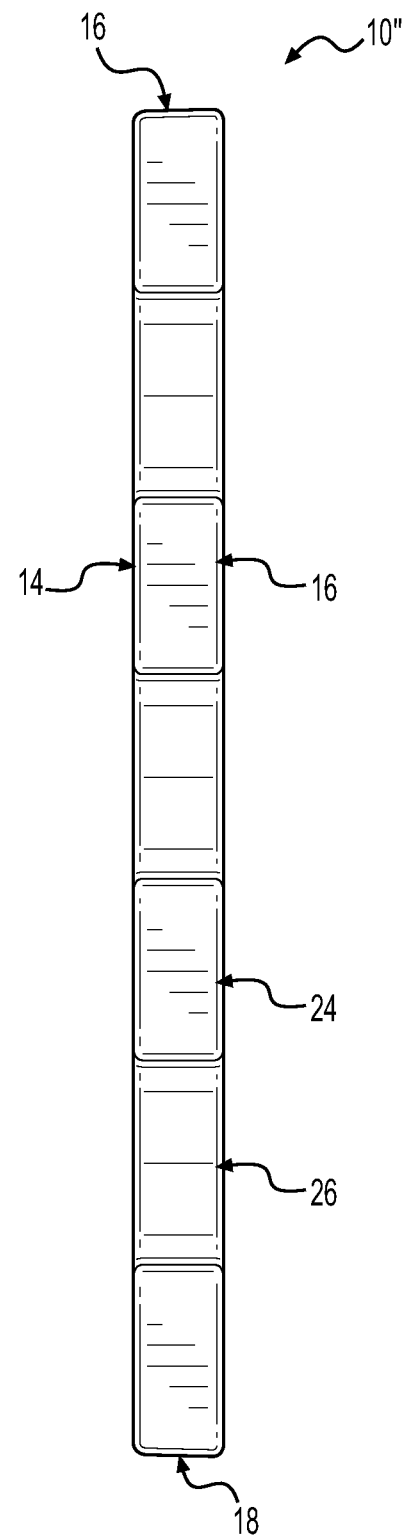
FIG. 20 is a left side view of the third embodiment of the present disclosure shown in FIG. 16.
Figure 21:
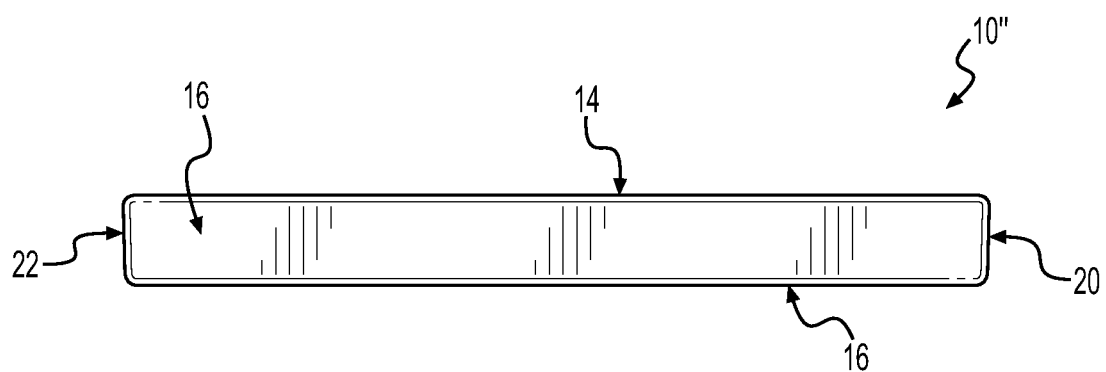
FIG. 21 is a top side view of the third embodiment of the present disclosure shown in FIG. 16.
Figure 22:
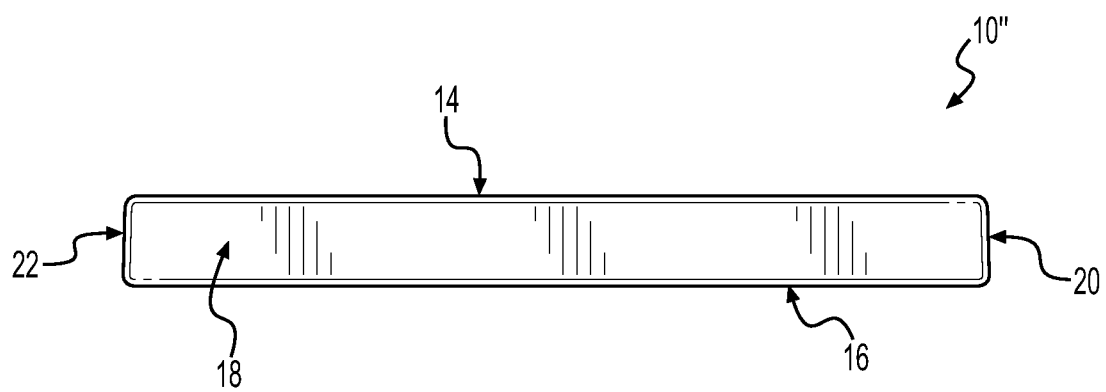
FIG. 22 is a bottom side view of the third embodiment of the present disclosure shown in FIG. 16.
Figure 23:
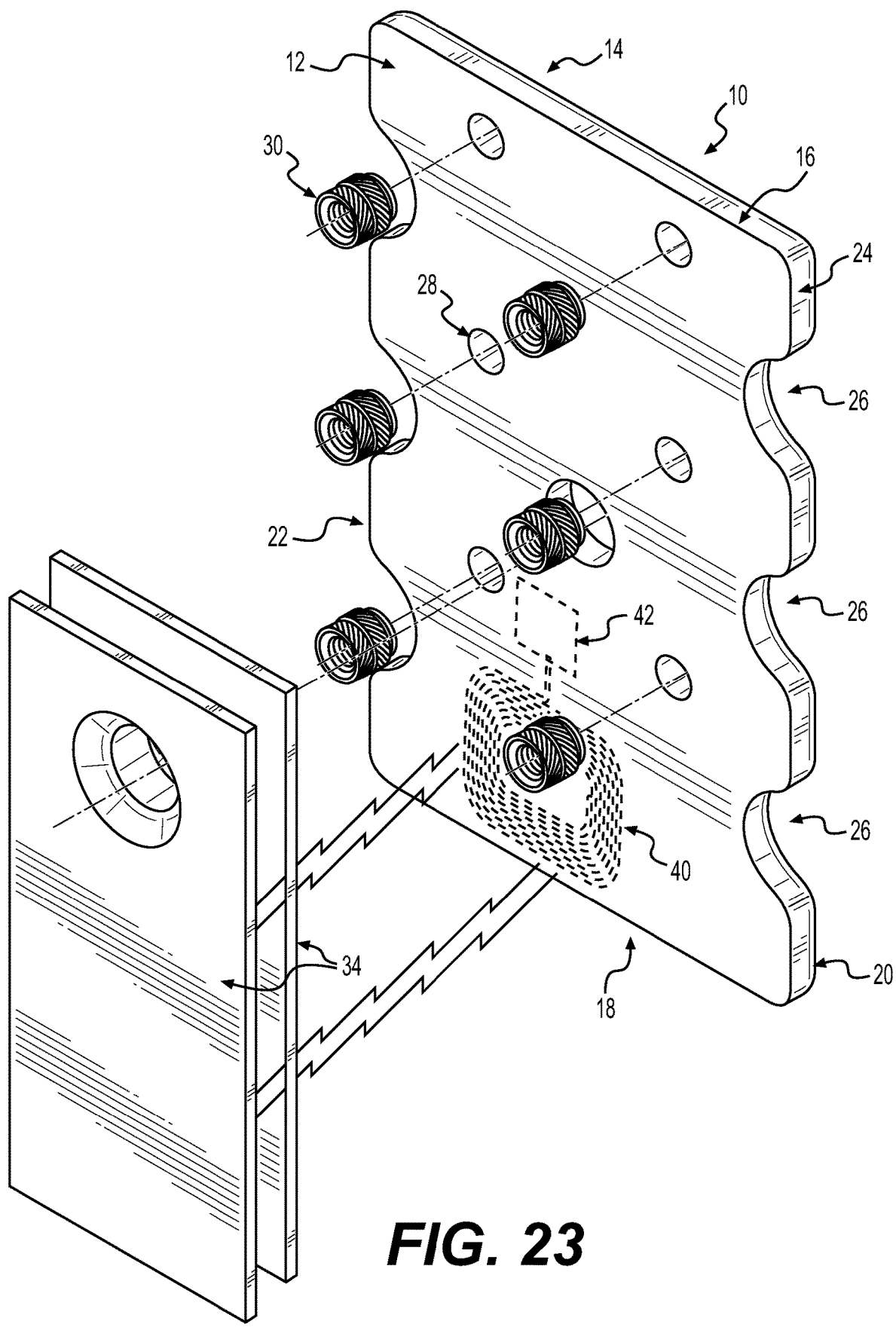
FIG. 23 is an exploded front perspective view of an embodiment of the present disclosure including two mobile devices in wireless and/or electrical communication with a wireless charging coil and wireless charging coil controller shown embedded within.

Referring now to FIGS. 16 and 18, a mobile device holder 10" according to an embodiment of the present disclosure is shown. Mobile device holder 10" may include one or more ribs 36 connecting one or more bosses 38 disposed on either the front face 12 or the back face 14 of the mobile device holder 10". The ribs 36 also connect to one or more interior walls 44 of the front side 12, back side 14, top side 16, and bottom side 18. The mobile device holder 10" may be configured with the ribs 36, bosses 38, and interior walls 44 due to manufacturing processes (i.e., injection molding) or the recessed sections 32 may be included for engineering processes (i.e., strength or reduction in weight) or finally for appearance (i.e., to incorporate a logo or other design).

The mobile device holder 10, 10' and 10" may be formed using a plurality of processes, including but not limited to polymer injection molding, additive or "3D" manufacturing, machining, stamping, or casting.

Other embodiments and uses of the disclosure will be apparent to those skilled in the art from consideration of the specification and practice of the disclosure disclosed herein. All references cited herein, including all publications, U.S. and foreign patents and patent applications, are specifically and entirely incorporated by reference. It is intended that the specification and examples be considered exemplary only with the true scope and spirit of the disclosure indicated by the following claims. Furthermore, the term "comprising of" includes the terms "consisting of" and "consisting essentially of."

What is claimed is:

1. A mobile device holder comprising:
    a front surface and a back surface, wherein the front surface and the back surface are joined by a top surface, a bottom surface, a right surface and a left surface;
    wherein the top surface, the bottom surface, the right surface and the left surface each include a planar section defining an outer right edge and an outer left edge, respectively, of the front surface and the back surface;
    wherein the planar sections of the right surface and the left surface further include a plurality of concave sections, wherein the concave sections extend into the front surface and back surface relative to the planar sections of the right surface and the left surface; and
    wherein the front surface and back surface further include a plurality of apertures that extend through the top surface, the bottom surface, the right surface and the left surface and receive a plurality of threaded inserts to selectively join a first mobile device to a second mobile device.

2. The mobile device holder of claim 1, further comprising a wireless charging controller connected to a wireless charging coil disposed in between the front surface and the back surface and bounded by the top surface, the bottom surface, the right surface and the left surface;
    wherein the wireless charging controller regulates electrical energy received from a wireless power source; and
    wherein the wireless charging coil receives electrical energy from the wireless power source to charge the mobile device.

3. The mobile device holder of claim 1, further comprising a plurality of recessed portions disposed on the front surface and extending into at least a portion of the top surface, the bottom surface, the right surface and the left surface.

4. The mobile device holder of claim 1, further comprising a plurality of recessed portions disposed on the back surface and extending into at least a portion of the top surface, the bottom surface, the right surface and the left surface.

5. The mobile device holder of claim 1, further comprising a plurality of recessed portions disposed on the front surface and the back surface and extending into at least a portion of the top surface, the bottom surface, the right surface and the left surface.

6. The mobile device holder of claim 1, the front surface further comprising:
    a plurality of ribs connected to the interior of the top surface, the bottom surface, the right surface, and the left surface,
    wherein the plurality ribs include a plurality of bosses disposed about the plurality of apertures extending through the front surface and the back surface.

7. A mobile device holder comprising:
    a front surface, a back surface, a top surface, a bottom surface, a right surface, a left surface, and a plurality of apertures disposed on the front surface and the back surface, the apertures extending through the top surface, the bottom surface, the right surface, and the left surface,
    wherein the front surface comprises an edge of a wall extending about a perimeter formed by the top surface, the bottom surface, the right surface and the left surface and a plurality of bosses surrounding the plurality of apertures,
    wherein the wall extends from the front surface to the bottom surface and along an interior of the perimeter,
    wherein the bottom surface includes a plurality of ribs joining the wall and the plurality of bosses containing the plurality of apertures to selectively join a first mobile device to a second mobile device,
    wherein the top surface, the bottom surface, the right surface and the left surface each include a planar section defining an outer right edge and an outer left edge, respectively, of the front surface and the back surface, and
    wherein the planar sections of the right surface and the left surface further include a plurality of concave sections, wherein the concave sections extend into the front surface and back surface relative to the planar sections of the right surface and the left surface.

8. The mobile device holder of claim 7, further comprising:
    a wireless charging controller connected to a wireless charging coil disposed in between the front surface and the back surface and bounded by the top surface, the bottom surface, the right surface and the left surface;

wherein the wireless charging controller regulates electrical energy received from a wireless power source; and wherein the wireless charging coil receives electrical energy from the wireless power source to charge the mobile device.

9. The mobile device holder of claim 7, further comprising a plurality of recessed portions disposed on the front surface and the back surface and extending into at least a portion of the top surface, the bottom surface, the right surface and the left surface.

10. A mobile device holder comprising:
a body having a front surface, a back surface, and a perimeter surface,
wherein the perimeter surface is disposed between the front surface and the back surface, the perimeter surface including a first concave section, the first concave section extending into the front surface and the back surface; and
a plurality of threaded inserts disposed in a plurality of apertures in the body extending through the front surface to the back surface to secure a first mobile device to a second mobile device.

11. The mobile device holder of claim 10, further comprising at least a second concave section of the perimeter surface interposed by a first non-concave section and the first concave section.

12. The mobile device holder of claim 10, further comprising a wireless charging system disposed within the body.

13. The mobile device holder of claim 12, wherein the wireless charging system includes a wireless charging controller and a wireless charging coil electrically connected to the wireless charging controller.

14. The mobile device holder of claim 10, further comprising a plurality of recessed sections disposed in the front surface of the body between the plurality of apertures.

15. The mobile device holder of claim 10, further comprising a plurality of recessed sections disposed in the back surface of the body between the plurality of apertures.

16. The mobile device holder of claim 10, further comprising a plurality of recessed sections disposed in the front surface and the back surface of the body between the plurality of apertures.

17. The mobile device holder of claim 10, wherein the front surface of the body is recessed and includes a plurality of ribs extending from an interior surface of the perimeter surface to a plurality of bosses forming the plurality of apertures.

18. The mobile device holder of claim 17, further comprising a wireless charging system disposed within the recessed surface of the front surface.

* * * * *